United States Patent [19]

Gosselink et al.

[11] Patent Number: 4,956,447

[45] Date of Patent: Sep. 11, 1990

[54] RINSE-ADDED FABRIC CONDITIONING COMPOSITIONS CONTAINING FABRIC SOFENING AGENTS AND CATIONIC POLYESTER SOIL RELEASE POLYMERS AND PREFERRED CATIONIC SOIL RELEASE POLYMERS THEREFOR

[75] Inventors: Eugene P. Gosselink, Cincinnati, Ohio; Frederick E. Hardy, Ponteland, England; Toan Trinh, Maineville, Ohio

[73] Assignee: The Procter & Gamble Company, Cincinnati, Ohio

[21] Appl. No.: 354,549

[22] Filed: May 19, 1989

[51] Int. Cl.$^5$ ............................................. C08G 63/02
[52] U.S. Cl. ................................ 528/272; 528/274; 528/288; 528/290; 528/291; 528/292; 528/300; 528/321; 528/335; 252/8.75; 252/8.8; 252/8.9; 252/526; 252/527; 252/545; 252/546
[58] Field of Search ............... 528/272, 274, 288, 290, 528/291, 292, 300, 321, 335; 252/8.75, 8.8, 8.9, 526, 527, 545, 546

[56] References Cited

U.S. PATENT DOCUMENTS

| | | | |
|---|---|---|---|
| 3,416,952 | 12/1968 | McIntyre et al. | 117/118 |
| 3,928,213 | 12/1975 | Temple et al. | 252/8.8 |
| 4,075,110 | 2/1978 | Duffin | 252/8.8 |
| 4,077,890 | 3/1978 | Barker | 252/8.8 |
| 4,136,038 | 1/1979 | Pracht et al. | 252/8.8 |
| 4,187,184 | 2/1980 | Becker et al. | 252/8.8 |
| 4,310,426 | 1/1982 | Smeltz | 252/8.8 |
| 4,318,956 | 3/1982 | Stevens et al. | 428/265 |
| 4,346,130 | 8/1982 | Tropea | 427/393.1 |
| 4,622,378 | 11/1986 | Gosselink | 528/66 |
| 4,659,802 | 4/1987 | Rubingh et al. | 528/405 |
| 4,661,267 | 4/1987 | Dekker et al. | 252/8.8 |
| 4,738,787 | 4/1988 | O'Lenick, Jr. et al. | 252/8.8 |

*Primary Examiner*—Morton Foelak
*Assistant Examiner*—Sam A. Acquah
*Attorney, Agent, or Firm*—Robert B. Aylor; Richard C. Witte

[57] ABSTRACT

Rinse-added fabric conditioning compositions containing cationic soil release polymers are much more effective than similar compositions containing nonionic soil release polymers for soil release. Most of the cationic soil release polymers are new compounds comprising a hydrophobic alkylene oxide/terephthalate portion which has a low molecular weight and at least a single cationic charge under use conditions.

25 Claims, No Drawings

"RINSE-ADDED FABRIC CONDITIONING COMPOSITIONS CONTAINING FABRIC SOFENING AGENTS AND CATIONIC POLYESTER SOIL RELEASE POLYMERS AND PREFERRED CATIONIC SOIL RELEASE POLYMERS THEREFOR"

TECHNICAL FIELD

This invention relates to compositions and methods for providing soil release benefits, fabric softening and/or antistatic benefits and to specific materials which can provide soil release benefits to fabrics during the rinse cycle of home laundering operations.

Liquid, rinse-added fabric softening compositions have long been known in the art and are widely utilized by consumers during the rinse cycles of automatic laundry operations. The term 'fabric softening' as used herein and as known in the art refers to a process whereby a desirably soft hand and fluffy appearance are imparted to fabrics. It is not common to provide a soil release treatment for fabrics in the rinse cycle.

BACKGROUND ART

Compositions containing cationic nitrogenous compounds in the form of quaternary ammonium salts and substituted imidazolinium salts having two long chain acyclic aliphatic hydrocarbon groups are commonly used to provide fabric softening benefits when used in laundry rinse operations (See, for example, U.S. Pat. Nos. 3,644,203, Lamberti et al., issued Feb. 22, 1972; and 4,426,299, Verbruggen, issued Jan. 17, 1984; also 'Cationic Surface Active Agents as Fabric Softeners,' R. R. Egan, Journal of the American Oil Chemists' Society, January 1978, pages 118–121; and 'How to Choose Cationics for Fabric Softeners,' J. A. Ackerman, Journal of the American Oil Chemists' Society, June 1983, pages 1166–1169, all of the above being incorporated herein by reference).

Quaternary ammonium salts having only one long chain acyclic aliphatic hydrocarbon group (such as monostearyltrimethyl ammonium chloride) are less commonly used because for the same chain length, compounds with two long alkyl chains were found to provide better softening performance than those having one long alkyl chain. (See, for example, 'Cationic Fabric Softeners,' W. P. Evans, Industry and Chemistry, July 1969, pages 893–903). U.S. Pat. No. 4,464,272, Parslow et al., issued Aug. 7, 1984, and incorporated herein by reference, also teaches that monoalkyl quaternary ammonium compounds are less effective softeners.

Another class of nitrogenous materials that are sometimes used in fabric softening compositions are the non-quaternary amide-amines. A commonly cited material is the reaction product of higher fatty acids with hydroxyalkyl alkylene diamines. An example of these materials is the reaction product of higher fatty acids and hydroxyethylethylenediamine (See 'Condensation Products from β-Hydroxyethylethylenediamine and Fatty Acids or Their Alkyl Esters and Their Application as Textile Softeners in Washing Agents,' H. W. Eckert, Fette-Seifen-Anstrichmittel, September 1972, pages 527–533). These materials are usually cited generically along with other cationic quaternary ammonium salts and imidazolinium salts as softening actives in fabric softening compositions. (See U.S. Pat. Nos. 4,460,485, Rapisarda et al., issued July 17, 1984; 4,421,792, Rudy et al., issued Dec. 20, 1983; and 4,327,133, Rudy et al., issued Apr. 27, 1982, all of said patents being incorporated herein by reference). U.S. Pat. No. 3,775,316, Berg et al., issued Nov. 27, 1973, incorporated herein by reference, discloses a softening finishing composition for washed laundry containing (a) the condensation product of hydroxyalkyl alkylpolyamine and fatty acids and (b) a quaternary ammonium compound mixture of (i) from 0% to 100% of quaternary ammonium salts having two long chain alkyl groups and (ii) from 100% to 0% of a germicidal quaternary ammonium compound of the formula $[R_5R_6R_7R_8N]^+A^-$ wherein $R_5$ is a long chain alkyl group, $R_6$ is a member selected from the group consisting of arylalkyl group and $C_3$–$C_{18}$ alkenyl and alkadienyl containing one or two C=C double bonds, $R_7$ and $R_8$ are $C_1$–$C_7$ alkyl groups, and A is an anion. U.S. Pat. No. 3,904,533, Neiditch et al., issued Sept. 9, 1975, incorporated herein by reference, teaches a fabric conditioning formulation containing a fabric softening compound and a low temperature stabilizing agent which is a quaternary ammonium salt containing one to three short chain $C_{10}$–$C_{14}$ alkyl groups; the fabric softening compound is selected from a group consisting of quaternary ammonium salts containing two or more long chain alkyl groups, the reaction product of fatty acids and hydroxyalkyl alkylene diamine, and other cationic materials.

Compositions containing nonpolyester-specific soil release polymers are described in U.S. Pat. Nos. 3,920,561, 4,075,110 (nylon-specific), and 4,136,038, all of said patents being incorporated herein by reference. However, consumers have indicated that stains on polyester fabrics are their No. 1 problem. See, e.g., 'Textiles from the Consumer's Viewpoint,' Mary E. Powers, *Textile Chemist and Colorist*, Vol. 16, (1984), pp. 228–231. Therefore, there are many patents which disclose compositions containing nonionic polyester-specific soil release agents (SRA's), e.g., U.S. Pat. Nos. 3,712,873, 4,187,184, 4,661,267 (also discloses cationic cellulosic soil release polymers), 4,702,857, 4,711,730, 4,713,194, and 4,721,580, all of said patents being incorporated herein by reference. U.S. Pat. No. 4,738,787, A. J. O'Lenick, Jr., et al., issued Apr. 19, 1988, incorporated herein by reference, discloses cationic block polyester compounds useful as soil release agents, softeners and antistatic agents. These materials are to be applied directly in aqueous solution by themselves or formulated with anionics and builders to prepare finished conditioner/detergent systems.

SUMMARY OF THE INVENTION

The present invention relates to fabric conditioning compositions for use in the rinse cycle of home laundry operations and to certain 'cationic' polyester soil release polymers that are especially effective when incorporated into such compositions as compared to corresponding nonionic or anionic soil release polymers or cellulose based cationic soil release polymers.

According to the present invention, a fabric conditioning composition is provided, preferably in the form of an aqueous dispersion, comprising from about 3% to about 35% by weight of fabric softener, and from about 0.5% to about 20%, preferably from about 1% to about 10%, of cationic polyester soil release agent, especially the preferred cationic polyester soil release agents defined herein. Rinse-added fabric softening compositions should be readily dispersible in the rinse water and are usually either liquid or particulate.

DETAILED DESCRIPTION OF THE INVENTION

The amount of fabric softening agent in the compositions of this invention is typically from about 3% to about 35%, preferably from about 4% to about 30%, more preferably from about 4% to about 25%, by weight of the composition. The lower limits are amounts needed to contribute effective fabric softening performance when added to laundry rinse baths in the manner which is customary in home laundry practice. The higher limits are suitable for concentrated products which provide the consumer with more economical usage due to a reduction of packaging and distributing costs.

The Composition

The rinse-added fabric conditioning, preferably softening, composition comprises the following components:

I. from about 3% to about 35%, preferably from about 4% to about 30%, more preferably from about 4% to about 25%, by weight of the total composition of fabric softener; and II. from about 0.5% to about 20%, preferably from about 1% to about 10%, more preferably from about 1% to about 5%, of cationic polyester soil release agent.

The fabric softener, Component I, can be, e.g., either conventional softener such as cationic softener, e.g., di-($C_{16-18}$)-di-($C_{1-4}$)-alkyl nitrogenous salts or more complex mixtures of cationic and nonionic fabric softeners in ratios of from about 1:10 to about 20:1, preferably from about 1:5 to about 10:1, such as a mixture comprising:

(a) from about 20% to about 80%, preferably from about 20% to about 60%, of the reaction product of higher fatty acids with a polyamine selected from the group consisting of hydroxyalkylalkylenediamines and dialkylenetriamines and mixtures thereof;

(b) from about 8% to about 40%, preferably from about 10% to about 30%, of cationic nitrogenous salts containing only one long chain acyclic aliphatic $C_{15}$-$C_{22}$ hydrocarbon group; and optionally, (c) from about 10% to about 80%, preferably from about 20% to about 60%, of cationic nitrogenous salts having two or more long chain acyclic aliphatic $C_{15}$-$C_{22}$ hydrocarbon groups or one said group and an arylalkyl group;

said (a), (b) and (c) percentages being by weight of Component I.

The balance of the composition preferably comprises a liquid carrier selected from the group consisting of water and mixtures of water and low molecular weight alcohols including polyols, and especially, $C_1$-$C_4$ monohydric alcohols.

As used herein, Component I can comprise mixtures of fabric softening agents.

Following are the general descriptions of the essentials and optionals of the present compositions including specific examples. The examples are provided herein for purposes of illustration only.

The Fabric Softeners

Fabric softeners that can be used herein are disclosed in U.S. Pat. Nos. 3,861,870, Edwards and Diehl; 4,308,151, Cambre; 3,886,075, Bernardino; 4,233,164, Davis; 4,401,578, Verbruggen; 3,974,076, Wiersema and Rieke; and 4,237,016, Rudkin, Clint, and Young, all of said patents being incorporated herein by reference. Other suitable softeners are described in the patents listed in the Background Art section of this specification, which are also incorporated by reference.

Preferred fabric softening agents are disclosed in U.S. Pat. No. 4,661,269, issued Apr. 28, 1987, in the names of Toan Trinh, Errol H. Wahl, Donald M. Swartley and Ronald L. Hemingway, said patent being incorporated herein by reference.

More biodegradable fabric softener compounds can be desirable. Biodegradability can be increased, e.g., by incorporating easily destroyed linkages into hydrophobic groups. Such linkages include ester linkages, amide linkages, and linkages containing unsaturation and/or hydroxy groups. Examples of such fabric softeners can be found in U.S. Pat. Nos. 3,408,361, Mannheimer, issued Oct. 29, 1968; 4,709,045, Kubo et al., issued Nov. 24, 1987; 4,233,451, Pracht et al., issued Nov. 11, 1980; 4,127,489, Pracht et al., issued Nov. 28, 1979; 3,689,424, Berg et al., issued Sept. 5, 1972; 4,128,485, Baumann et al., issued Dec. 5, 1978; 4,161,604, Elster et al., issued July 17, 1979; 4,189,593, Wechsler et al., issued Feb. 19, 1980; and 4,339,391, Hoffman et al., issued July 13, 1982, said patents being incorporated herein by reference.

Preferred fabric softeners of the invention comprise the following:

Component I(a)

Preferred softening agents (actives) of the present invention are the reaction products of higher fatty acids with a polyamine selected from the group consisting of hydroxyalkylalkylenediamines and dialkylenetriamines and mixtures thereof. These reaction products are mixtures of several compounds in view of the multifunctional structure of the polyamines (see, for example, the publication by H. W. Eckert in Fette-Seifen-Anstrichmittel, cited above).

The preferred Component I(a) is nitrogenous compounds selected from the group consisting of the reaction product mixtures or some selected components of the mixtures. More specifically, the preferred Component I(a) is compounds selected from the group consisting of:

(i) reaction products of higher fatty acids with hydroxyalkylalkylenediamines in a molecular ratio of about 2:1, said reaction products containing compounds of the formula:

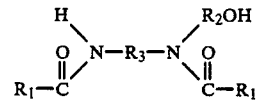

wherein each $R_1$ is an acyclic aliphatic $C_{15}$-$C_{21}$ hydrocarbon group and $R_2$ and $R_3$ are divalent $C_1$-$C_3$ alkylene groups;

(ii) substituted imidazoline compounds having the formula:

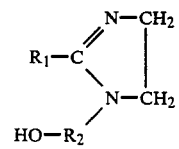

wherein $R_1$ and $R_2$ are defined as above;
(iii) substituted imidazoline compounds having the formula:

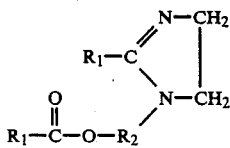

wherein $R_1$ and $R_2$ are defined as above;
(iv) reaction products of higher fatty acids with dialkylenetriamines in, e.g., a molecular ratio of about 2:1, said reaction products containing compounds of the formula:

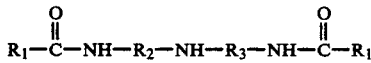

wherein $R_1$, $R_2$ and $R_3$ are defined as above;
(v) substituted imidazoline compounds having the formula:

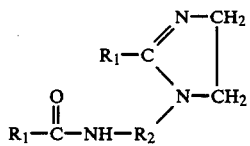

wherein $R_1$ and $R_2$ are defined as above; and mixtures thereof.

Component I(a)(i) is commercially available as Mazamide® 6, sold by Mazer Chemicals, or Ceranine® HC, sold by Sandoz Colors & Chemicals; here the higher fatty acids are hydrogenated tallow fatty acids and the hydroxyalkylalkylenediamine is N-2-hydroxyethylethylenediamine, and $R_1$ is an aliphatic $C_{15}$–$C_{17}$ hydrocarbon group, and $R_2$ and $R_3$ are divalent ethylene groups.

An example of Component I(a)(ii) is stearic hydroxyethyl imidazoline wherein $R_1$ is an aliphatic $C_{17}$ hydrocarbon group, $R_2$ is a divalent ethylene group; this chemical is sold under the trade names of Alkazine® ST by Alkaril Chemicals, Inc., or Schercozoline® S by Scher Chemicals, Inc.

An example of Component I(a)(iv) is N,N''-ditallowalkoyldiethylenetriamine where $R_1$ is an aliphatic $C_{15}$–$C_{17}$ hydrocarbon group and $R_2$ and $R_3$ are divalent ethylene groups.

An example of Component I(a)(v) is 1-tallowamidoethyl-2-tallowimidazoline wherein $R_1$ is an aliphatic $C_{15}$–$C_{17}$ hydrocarbon group and $R_2$ is a divalent ethylene group.

The Component I(a)(v) can also be first dispersed in a Bronstedt acid dispersing aid having a pKa value of not greater than 6; provided that the pH of the final composition is not greater than 7. Some preferred dispersing aids are formic acid, hydrochloric acid, phosphoric acid, and/or methylsulfonic acid.

Both N,N''-ditallowalkoyldiethylenetriamine and 1-tallowethylamido-2-tallowidimidazoline are reaction products of tallow fatty acids and diethylenetriamine, and are precursors of the cationic fabric softening agent methyl-1-tallowamidoethyl-2-tallowimidazolinium methylsulfate (see 'Cationic Surface Active Agents as Fabric Softeners,' R. R. Egan, Journal of the American Oil Chemicals' Society, January 1978, pages 118–121). N,N,''-ditallowalkoyldiethylenetriamine and 1-tallowamidoethyl-2-tallowimidazoline can be obtained from Sherex Chemical Company as experimental chemicals. Methyl-1-tallowamidoethyl-2-tallowimidazolinium methylsulfate is sold by Sherex Chemical Company under the trade name Varisolt® 475.

Component I(b)

The preferred Component I(b) is a cationic nitrogenous salt containing one long chain acyclic aliphatic $C_{15}$–$C_{22}$ hydrocarbon group selected from the group consisting of:
(i) acyclic quaternary ammonium salts having the formula:

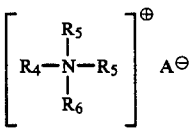

wherein $R_4$ is an acyclic aliphatic $C_{15}$–$C_{22}$ hydrocarbon group, $R_5$ and $R_6$ are $C_1$–$C_4$- saturated alkyl or hydroxyalkyl groups, and $A^\ominus$ is an anion, especially as described in more detail hereinafter;
(ii) substituted imidazolinium salts having the formula:

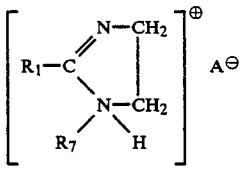

wherein $R_1$ is an acyclic aliphatic $C_{15}$–$C_{21}$ hydrocarbon group, $R_7$ is a hydrogen or a $C_1$–$C_4$ saturated alkyl or hydroxyalkyl group, and $A^\ominus$ is an anion;
(iii) substituted imidazolinium salts having the formula:

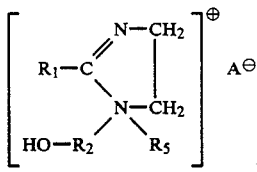

wherein $R_2$ is a divalent $C_1$–$C_3$ alkylene group and $R_1$, $R_5$ and $A^\ominus$ are as defined above;
(iv) alkylpyridinium salts having the formula:

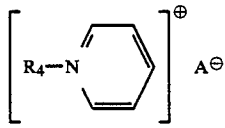

wherein $R_4$ is an acyclic aliphatic $C_{16}$–$C_{22}$ hydrocarbon group and $A^\ominus$ is an anion; and
(v) alkanamide alkylene pyridinium salts having the formula:

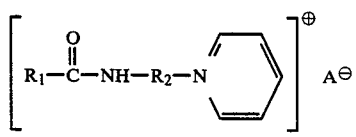

5 wherein $R_1$ is an acyclic aliphatic $C_{15}$–$C_{21}$ hydrocarbon group, $R_2$ is a divalent $C_1$–$C_3$ alkylene group, and $A^\ominus$ is an ion group;
and mixtures thereof.

Examples of Component I(b)(i) are the monoalkyl-trimethylammonium salts such as monotallowtrimethylammonium chloride, mono(hydrogenated tallow)-trimethylammonium chloride, palmityltrimethylammonium chloride and soyatrimethylammonium chloride, sold by Sherex Chemical Company under the trade names Adogen® 471, Adogen 41, Adogen 444, and Adogen 415, respectively. In these salts, $R_4$ is an acyclic aliphatic $C_{16}$–$C_{18}$ hydrocarbon group, and $R_5$ and $R_6$ are methyl groups. Mono(hydrogenated tallow)trimethylammonium chloride and monotallow-trimethylammonium chloride are preferred. Other examples of Component I(b)(i) are behenyltrimethylammonium chloride wherein $R_4$ is a $C_{22}$ hydrocarbon group and sold under the trade name Kemamine® Q2803-C by Humko Chemical Division of Witco Chemical Corporation; soyadimethylethylammonium ethosulfate wherein $R_4$ is a $C_{16}$–$C_{18}$ hydrocarbon group, $R_5$ is a methyl group, $R_6$ is an ethyl group, and A is an ethylsulfate anion, sold under the trade name Jordaquat® 1033 by Jordan Chemical Company; and methyl bis(2-hydroxyethyl)octadecylammonium chloride wherein $R_4$ is a $C_{18}$ hydrocarbon group, $R_5$ is a 2-hydroxyethyl group and $R_6$ is a methyl group and available under the trade name Ethoquad® 18/12 from Armak Company.

An example of Component I(b)(iii) is 1-ethyl-1-(2-hydroxyethyl)-2-isoheptadecylimidazolinium ethylsulfate wherein $R_1$ is a $C_{17}$ hydrocarbon group, $R_2$ is an ethylene group, $R_5$ is an ethyl group, and A is an ethylsulfate anion. It is available from Mona Industries, Inc., under the trade name Monaquat® ISIES.

Component I(c)

Preferred cationic nitrogenous salts having two or more long chain acyclic aliphatic $C_{15}$–$C_{22}$ hydrocarbon groups or one said group and an arylalkyl group are selected from the group consisting of:
(i) acyclic quaternary ammonium salts having the formula:

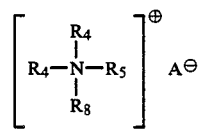

wherein each $R_4$ is an acyclic aliphatic $C_{15}$–$C_{22}$- hydrocarbon group, $R_5$ is a $C_1$–$C_4$ saturated alkyl or hydroxyalkyl group, $R_8$ is selected from the group consisting of $R_4$ and $R_5$ groups, and $A^\ominus$ is an anion defined as above;
(ii) diamido quaternary ammonium salts having the formula:

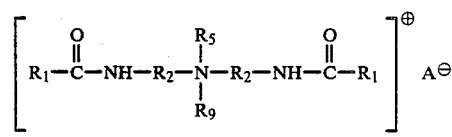

wherein each $R_1$ is an acyclic aliphatic $C_{15}$–$C_{21}$ hydrocarbon group, $R_2$ is a divalent alkylene group having 1 to 3 carbon atoms, $R_5$ and $R_9$ are $C_1$–$C_4$ saturated alkyl or hydroxyalkyl groups, and $A^\ominus$ is an anion;
(iii) diamino alkoxylated quaternary ammonium salts having the formula:

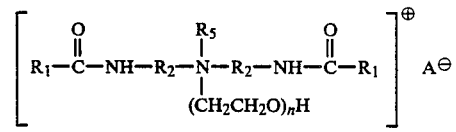

wherein n is equal to 1 to about 5, and $R_1$, $R_2$, $R_5$ and $A^\ominus$ are as defined above;
(iv) quaternary ammonium compounds having the formula:

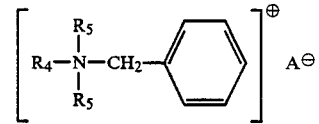

wherein each $R_4$ is an acyclic aliphatic $C_{15}$–$C_{22}$ hydrocarbon group, each $R_5$ is a $C_1$–$C_4$ saturated alkyl or hydroxyalkyl group, and $A^\ominus$ is an anion;
(v) substituted imidazolinium salts having the formula:

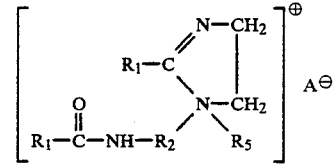

wherein each $R_1$ is an acyclic aliphatic $C_{15}$–$C_{21}$ hydrocarbon group, $R_2$ is a divalent alkylene group having 1 to 3 carbon atoms, and $R_5$ and $A^\ominus$ are as defined above; and
(vi) substituted imidazolinium salts having the formula:

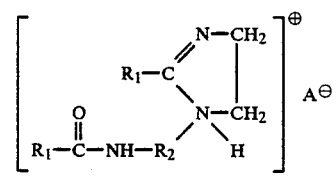

wherein $R_1$, $R_2$ and $A^\ominus$ are as defined above; and mixtures thereof.

Examples of Component I(c)(i) are the well-known dialkyldimethylammonium salts such as ditallowdimethylammonium chloride, ditallowdimethylammonium methylsulfate, di(hydrogenated tallow)dimethylammonium chloride, distearyldimethylammonium chloride, dibehenyldimethylammonium chloride. Di(hydrogenated tallow)dimethylammonium chloride and ditallowdimethylammonium chloride are preferred. Examples of commercially available dialkyldimethylammonium salts usable in the present invention are di(hydrogenated tallow)dimethylammonium chloride (trade name Adogen 442), ditallowdimethylammonium chloride (trade name Adogen 470), distearyldimethylammonium chloride (trade name Arosurf ® TA-100), all available from Sherex Chemical Company. Dibehenyldimethylammonium chloride wherein $R_4$ is an acyclic aliphatic $C_{22}$ hydrocarbon group is sold under the trade name Kemamine Q-2802C by Humko Chemical Division of Witco Chemical Corporation.

Examples of Component I(c)(ii) are methylbis(tallowamidoethyl) (2-hydroxyethyl)ammonium methylsulfate and methylbis(hydrogenated tallowamidoethyl)(2-hydroxyethyl)ammonium methylsulfate wherein $R_1$ is an acyclic aliphatic $C_{15}$–$C_{17}$ hydrocarbon group, $R_2$ is an ethylene group, $R_5$ is a methyl group, $R_9$ is a hydroxyalkyl group and A is a methylsulfate anion; these materials are available from Sherex Chemical Company under the trade names Varisoft 22 and Varisoft 110, respectively.

An example of Component I(c)(iv) is dimethylstearylbenzylammonium chloride wherein $R_4$ is an acyclic aliphatic $C_{18}$ hydrocarbon group, $R_5$ is a methyl group and A is a chloride anion, and is sold under the trade names Varisoft SDC by Sherex Chemical Company and Ammonyx ® 490 by Onyx Chemical Company.

Examples of Component I(c)(v) are 1-methyl-1-tallowamidoethyl-2-tallowimidazolinium methylsulfate and 1-methyl-1-(hydrogenated tallowamidoethyl)-2-(hydrogenated tallow)imidazolinium methylsulfate wherein $R_1$ is an acyclic aliphatic $C_{15}$–$C_{17}$ hydrocarbon group, $R_2$ is an ethylene group, $R_5$ is a methyl group and A is a chloride anion; they are sold under the trade names Varisoft 475 and Varisoft 445, respectively, by Sherex Chemical Company.

A preferred composition contains Component I(c) which is selected from the group consisting of: (i) di(hydrogenated tallow)dimethylammonium chloride and (v) methyl-1-tallowamidoethyl-2-tallowimidazolinium methylsulfate; and mixtures thereof. A preferred combination of ranges for Component I(a) is from about 20% to about 80%; for Component I(b) from about 8% to about 40%; and for Component I(c) from about 10% to about 80%, all ranges being by weight of Component I.

Where Components I(a), I(b) and I(c) are present, Component I is preferably present at from about 4% to about 30% by weight of the total composition. More specifically, this composition is more preferred wherein Component I(a) is selected from the group consisting of 1-tallowamidoethyl-2-tallowimidazoline and the reaction product of about 2 moles of hydrogenated tallow fatty acids with about 1 mole of N-2-hydroxyethylethylenediamine, and mixtures thereof, and is present at a level of from about 20% to about 60% by weight of Component I; and wherein Component I(b) is mono(hydrogenated tallow)trimethylammonium chloride present at a level of from about 10% to about 30% by weight of Component I; and wherein Component I(c) is selected from the group consisting of di(hydrogenated tallow)dimethylammonium chloride, ditallowdimethylammonium chloride and methyl-1-tallowamidoethyl-2-tallowimidazolinium methylsulfate, and mixtures thereof; said Component I(c) is present at a level of from about 20% to about 60% by weight of Component I; and wherein the weight ratio of said di(hydrogenated tallow)dimethylammonium chloride to said methyl-1-tallowamidoethyl-2-tallowimidazolinium methylsulfate is from about 2:1 to about 6:1.

The above individual components can also be used individually, especially those of I(c).

Anion A

In the cationic nitrogenous salts herein, the anion $A^{\ominus}$ provides electrical neutrality. Most often, the anion used to provide electrical neutrality in these salts is a halide, such as chloride, bromide, or iodide. However, other anions can be used, such as methylsulfate, ethylsulfate, acetate, formate, sulfate, carbonate, and the like. Chloride and methylsulfate are preferred herein as anion A.

Cationic Polyester Soil Release Agent (CPSRA)

The cationic soil release polymers, or oligomers, are characterized by having (a) one or more polyester hydrophobic blocks comprising alternating terephthaloyl (T) groups and oxyalkyleneoxy (AO) groups, (b) one or more hydrophilic cationic groups, and (c) optional, but preferred hydrophilic poly(oxyethylene)oxy ($E_n$) groups, the overall net charge of the polymer or oligomer being cationic at the pH of use. The preferred CPSRA polymers have a molecular weight of less than about 50,000, preferably less than about 20,000, more preferably less than about 10,000, to make it easier to formulate readily dispersible, e.g., aqueous, fabric softener compositions. Higher molecular weight polymers can be formulated, especially if they are predispersed.

The polymers or oligomers preferably have hydrophobic polyester blocks containing alternating terephthaloyl and oxyethyleneoxy groups to optimize deposition on polyester fabrics. However, there can be substitution on the terephthaloyl and/or oxyethyleneoxy groups. Preferably the amount of substitution is limited to permit effective deposition on polyester fabrics. Alkyl groups, anionic groups, cationic groups and capped poly(oxyethylene)oxy groups can all be attached to the hydrophobic polyester block, but not to the extent that deposition is eliminated, or severely lessened. The oxyethyleneoxy groups can also be replaced by the oxypropyleneoxy (oxy-1,2-propyleneoxy) groups or mixtures of oxyethyleneoxy and oxypropyleneoxy groups.

Linking groups, anionic groups, nonionic groups, etc., can be present in the polymer so long as the overall cationic nature is maintained and the polymer (or oligomer) will deposit properly.

Poly(oxyethylene)oxy groups and charged groups on the CPSRA modify the surface of the polyester fibers to make them less hydrophobic, thus promoting removal of oily, greasy stains.

A generic empirical formula for some preferred cationic polyester soil release agents (CPSRA's) is:

$$(AO)_x(T)_y(CAT)_z(E_n)_q(L)_r(FCG)_s$$

wherein:
(I) Each (AO) represents an oxyalkyleneoxy group, excluding oxyalkyleneoxy groups of ($E_n$), containing from 2 to about 6 carbon atoms, preferably 1,2-oxyalkyleneoxy, and more preferably selected from the group consisting of: oxyethyleneoxy, oxy-1,2-propyleneoxy, and mixtures thereof, and each "x" is from to about 80, preferably from about 1 to about 25, more preferably from about 1.25 to about 15;

(II) Each (T) represents a terephthaloyl group (other non-charged charged moieties which have two "terminal" carbonyl groups can also be present, at least in a small percentage, and especially other noncharged aryl moieties with two "terminal" carbonyl groups) and each "y" is from about 1 to about 80, preferably, from about 1 to about 25, most preferably from about 1.25 to about 15.

[Noncharged, hydrophobic aryldicarbonyl units are preferably, exclusively terephthaloyl units. Other noncharged, hydrophobic aryldicarbonyl units, such as isophthaloyl, or the like, can also be present if desired, provided that the soil release properties of the esters (especially polyester substantivity) are not significantly diminished.]

(III) Each (CAT) represents a cationic group comprising at least one moiety selected from the group consisting of:

$(R)_m N (-)_{3-m}$ wherein each "m" is from 0 to 2;
$(R)_m N^{\oplus} (-)_{4-m} A^{\ominus}$ wherein each "m" is from 0 to 3; and

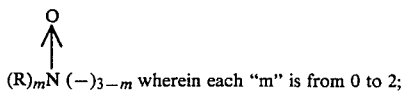

wherein each R is selected from the group consisting of $C_{1-4}$ alkyl groups, $C_{1-4}$ hydroxyalkyl groups, $C_{2-4}$ alkylene groups, $C_{2-4}$ oxyalkylene groups, phenyl, phenyl $C_{1-4}$ alkyl groups, and hydrogen, and wherein two R groups can be joined to form cyclic structures such as

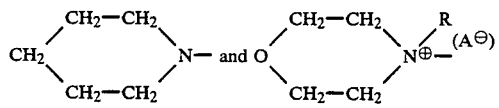

wherein each (—) represents a covalent bond and two or more (—) can be grouped to represent a multiple bond such as

and wherein each $A^{\ominus}$ is any compatible anion, as defined hereinbefore and each "z" is from 1 to about 100 depending on the molecular weight of the polymer, to provide the cationic charge to the polymer;

(IV) Each $(E_n)$ represents a poly(oxyethylene)oxy group $-(OCH_2CH_2)_nO-$ wherein each "n" is from 2 to about 200, more preferably from about 6 to about 100, most preferably from about 10 to about 80, and each "q" is less than about 25, preferably less than about 10, most preferably less than about 5 (Generally, it is preferred that each "q" is at least about 1. In an alternate, less preferred structure, each "q" is about 0.) (There can be a small amount of higher oxyalkylene groups present, so long as the group $(E_n)$ maintains its hydrophilic character.);

(V) Each optional (L) represents a linking group comprising at least one hydrocarbylene (e.g., alkylene or arylene) group having from 2 to about 4 covalent bonds (excluding bonds to hydrogen) and containing from one to about 10, preferably from about 1 to about 4, more preferably from about 1 to about 2, carbon atoms and, optionally, one or more, preferably from 1 to 4, groups selected from the group consisting of

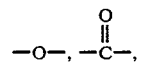

and mixtures thereof and each "r" is from 0 to about 100, depending on the number "z" of (CAT) groups; and (VI) Each optional Formula Completing Group (FCG) is selected from the group consisting of (a) H—, (b) —OH—, (c) $C_{1-18}$ alkyl, alkoxy, or hydroxy alkyl groups, (d) —C(O)OH, and (e) anionic groups (AN) such as sulfate, sulfonate, carboxylate, etc., neutralized with a compatible cation such as sodium, potassium, magnesium, ammonium, substituted ammonium, etc., and each "s" is a number from 0 to a number sufficient to complete the formula, preferably from 0 to about 100; and when present, preferably from about 2 to about 50, more preferably from about 2 to about 10;

(Longer alkyl or hydroxy alkyl groups are not desirable for performance reasons and are not needed in compositions containing conventional fabric softeners. $C_{1-4}$ alkyl and hydroxy alkyl groups are preferred, especially when the molecular weight of the polymer is above about 10,000. Such CPSRA's are novel compounds.)

and wherein the molecular weight of the CPSRA is less than about 50,000, preferably less than about 20,000, more preferably less than about 10,000, and the net cationic charge of the CPSRA is at least about one per 15,000 molecular weight units, preferably at least about one per 10,000 molecular weight units, more preferably at least about one per 5,000 molecular weight units, and most preferably about one per from about 150 to about 3,000 molecular weight units. At least one (FCG) is usually present.

The empirical formula is selected to give CPSRA's having molecular weights of from about 500 to about 50,000, preferably from about 500 to about 20,000, more preferably from about 800 to about 10,000, having a balance of hydrophobicity and hydrophilicity that permits them to effectively deposit on polyester fabric surfaces. The number of (CAT) groups is sufficiently large to provide an overall cationic character to the polymer or oligomer, especially when the structure contains a small amount of optional anionic groups.

As discussed hereinbefore, the structure is also comprised of one or more blocks containing alternating (AO) and (T) groups (hydrophobic polyester blocks) to provide from about 10% to about 80%, preferably from about 15% to about 70%, more preferably from about 20% to about 60% of the molecular weight on the average.

The (CAT) groups, which provide cationic functionality are completed by having R groups which are either hydrogen or, preferably, carbon atoms which in turn can be attached to either other carbon atoms or hydrogen atoms. The (CAT) groups can be attached, e.g., through (L) groups, to the rest of the polymer so that the (CAT) groups can be either at the end of, or within the polymer or oligomer chain (either the primary chain or side chain), or pendant on groups such as (L) which are present in the chain.

The CPSRA's herein are essentially free of unstable linkages such as —O—O—, —C(O)OO(O)C—, =N—N= (e.g., hydrazide), (O←NH$_3$; etc. Also, the relatively stable ester linkages can hydrolyze to a limited extent so that the CPSRA's, including those having the empirical formula, include such partial hydrolysis products. The empirical formula is also intended to represent substituted polymers or oligomers where the overall essential cationic character of the polymer/oligomer is unchanged.

The CPSRA's have a balance of hydrophobicity and hydrophilicity that permits them to effectively deposit on fabric surfaces. Mixtures of such esters with reaction by-products and the like retain their utility as fabric soil release agents when they contain at least 10% by weight of said esters. The preferred esters herein are of relatively low molecular weight (i.e., outside the range of fiber-forming polyesters) typically ranging from about 500 to about 20,000, preferably less than about 10,000.

The hydrophobic moieties are substantially linear, comprising, preferably, oxy-1,2-alkyleneoxy groups and terephthaloyl in mole ratios ranging from about 2:1 to about 1:2.

The preferred oxyalkyleneoxy units are the symmetrical oxyethyleneoxy units, the unsymmetrical oxy-1,2-propyleneoxy units, and mixtures thereof, preferably mixtures having ratios of oxyethyleneoxy/oxypropyleneoxy of from about 10:1 to about 1:10, more preferably from about 5:1 to about 1:5.

Such CPSRA's can also include oligomeric or low molecular weight polymeric, substantially linear, esters comprising at least some other unsymmetrically substituted oxy-1,2-alkyleneoxy units.

Examples of "unsymmetrically substituted oxy-1,2-alkyleneoxy" units of the esters herein are units selected from the group consisting of (a) —OCH(R$^a$)CH(R$^b$)O— units, wherein R$^a$ and R$^b$ are selected so that in each of said units, one of said groups is H and the other is a R group other than hydrogen, and (b) mixtures of the foregoing units wherein the R groups other than hydrogen are different. Mixtures of the unsymmetrical units (a) or (b) with —OCH$_2$CH$_2$O— units can also be used, whether or not the units taken together have an unsymmetrical character. A convenient measure of "unsymmetrical character" is given by the mole ratio of units (a) or (b) to —OCH$_2$CH$_2$O— units, which typically lie in the range from about 1:10 to about 1:0. In the above, R typically is a noncharged group, other than hydrogen, and has low molecular weight (typically below about 100), is chemically unreactive (especially in that it is a nonesterifiable group), and is comprised of C and H, or of C,H and O. In the above-defined mixtures of units (a) or (b) with —OCH$_2$CH$_2$O— units, usually excluded are poly(oxyethylene)oxy units (E$_n$), i.e., ─(OCH$_2$CH$_2$─)$_n$O— wherein n is a number greater than or equal to 2. [Such poly(oxyethylene)oxy units form a separate category of units which are preferred, although optional, as further discussed hereinafter.] The preferred R groups are selected from the group consisting of lower n-alkyl groups, such as methyl, ethyl, propyl and butyl. Thus, typical unsymmetrical oxy-1,2-alkyleneoxy units are oxy-1,2-propyleneoxy; oxy-1,2-butyleneoxy; oxy-1,2-pentyleneoxy; and oxy-1,2-hexyleneoxy units. Especially preferred unsymmetrical oxy-1,2-alkyleneoxy units are oxy-1,2-propyleneoxy units (a), and mixtures thereof with oxyethyleneoxy units (c) in the above-defined mole ratios.

Oxyethyleneoxy groups can have pendant groups, e.g., (CAT) and/or (E$_n$) groups, either attached directly, or through an, e.g., (L) group.

Noncharged, hydrophobic aryldicarbonyl units (T) are preferably, exclusively terephthaloyl units. Other noncharged, hydrophobic aryldicarboyl units, such as isophthaloyl or the like, can also be present if desired, provided that the soil release properties of the esters (especially polyester substantivity) are not significantly diminished.

It is highly preferred to incorporate more than the minimum amount of hydrophilic units into the esters. These are most preferably nonionic hydrophilic units, such as poly(oxyethylene)oxy groups (E$_n$); or, in another example, relatively hydrophilic cationic groups (CAT). Suitable relatively hydrophilic cationic groups of this type are illustrated by

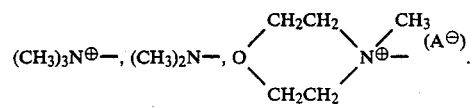

If the preferred hydrophilic units e.g., poly(oxyethylene)oxy units (E$_n$), quaternary ammonium units (CAT), or mixtures thereof, are present in the interior structure of the polymer, they generally will comprise at least about 0.02 moles per mole of said ester.

The CPSRA's are preferably substantially free of poly(ethyleneiminodiacetate) groups, especially where there are more than two of such groups in the chain. Preferably, there are no such groups in the CPSRA.

Generally, herein, if it is desired to modify the units of the esters, use of additional hydrophilic units is preferable to use of additional noncharged, hydrophobic units.

As discussed hereinbefore, compatible anions include halides (especially choride and bromide), sulfate, methane sulfonate and methyl sulfate anions.

Molecular Geometry

These CPSRA's are preferably "substanstantially linear", in the sense that they are not significanty branched or crosslinked, e.g., by virtue of the incorporation into their structure of units having more than two ester-bond forming sites. Furthermore, no cyclic esters are essential, but cyclic esters can be present in the compositions at low levels as a result of side-reactions during ester synthesis. Preferably, cyclic esters will not exceed about 2% by weight of the compositions; most preferably, they will be entirely absent from the compositions.

Contrasting with the above, the term "substantially linear" as applied to the esters herein does, however, expressly encompass materials which contain side-chains which are unreactive in ester-forming or transesterification reactions. Thus, oxy-1,2-propyleneoxy units are of a suitable unsymmetrically substituted type. Their methyl groups do not constitute what is conventionally regarded as "branching" in polymer technology (see Odian, Principles of Polymerization, Wiley, N.Y., 1981, pages 18–19, with which the present definitions are fully consistent), are unreactive in ester-forming reactions, and are acceptable for the purposes of the invention. Optional units in the esters of the invention can likewise have side-chains, provided that they conform with the same nonreactivity criterion.

CPSRA Synthesis

The overall synthesis is usually multi-stage, involving at least two stages, such as an initial esterification or transesterification (also known as ester interchange) stage followed by an oligomerization or polymerization stage, in which molecular weights of the esters are increased, but only to the limited extent specified hereinbefore.

Formation of ester-bonds involves elimination of low molecular weight by-products such as water, or simple alcohols. Complete removal of the latter from reaction mixtures is generally somewhat easier than removal of the former. However, since the ester bond forming reactions are generally reversible, it is necessary to "drive" the reactions forward in both instances, removing these by-products.

In practical terms, in the first stage (ester interchange) the reactants are mixed in appropriate proportions and are heated, to provide a melt, at atmospheric or slightly superatmospheric pressures (preferably of an inert gas such as nitrogen or argon). Water and/or low molecular weight alcohol is liberated and is distilled from the reactor at temperatures up to about 220° C. (A temperature range of from about 150°–200° C. is normal for this stage, but up to 220° C. can be used near the end).

In the second (i.e., oligomerization) stage, vacuum or inert gas sparging techniques and temperatures somewhat higher than in the first stage are applied; removal of volatile by-products and excess reactants continues, until the reaction is complete, for example as monitored by conventional spectroscopic techniques. (Inert gas sparging which can be used in this stage involves forcing an inert gas, such as nitrogen or argon, through the reaction mixture to purge the reaction vessel of the abovementioned volatiles; in the alternative, continuously applied vacuum, typically from about 10 mm Hg to about 0.1 mm Hg can be used the latter technique is preferred especially when high viscosity melts are being reacted).

In both of the above-described reaction stages, it is necessary to balance on one hand the desire for rapid and complete reaction (higher temperatures and shorter times preferred), against the need to avoid thermal degradation (which undesirably might result in off-colors and by-products). It is possible to use generally higher reaction temperatures especially when reactor design minimizes super-heating or "hot spots"; also, ester-forming reactions in which the ethylene glycol:propylene glycol ratio is high, are more tolerant of higher temperatures. Thus, a suitable temperature for oligomerization lies most preferably in the range of from about 150° C. to about 260° C. when predominantly ethylene glycol is present and in the range of from about 150° C. to about 240° C. when unsymmetrical glycols predominate (assuming that no special precautions, such as of reactor design, are otherwise taken to limit thermolysis).

It is very important in the above-described procedure to use continuous mixing, so that the reactants are always in good contact; highly preferred procedures involve formation of a well-stirred homogeneous melt of the reactants in the temperature ranges given above. It is also highly preferred to maximize the surface area of reaction mixture which is exposed to vacuum or inert gas to facilitate the removal of volatiles, especially in the oligomerization or polymerization step; mixing equipment of a high-shear vortex-forming type and gas spargers giving good gas-liquid contact are best suited for this purpose.

Catalysts and catalyst levels appropriate for esterification, transesterification, oligomerization, and for combinations thereof, are all well-known in polyester chemistry, and will generally be used herein; as noted above, a single catalyst will suffice. Suitably catalytic metals are reported in Chemical Abstracts, CA83:178505v, which states that the catalytic activity of transition metal ions during direct esterification of K and Na carboxybenzenesulfonates by ethylene glycol decreases in the order Sn (best), Ti, Pb, Zn, Mn, Co (worst).

The reactions can be continued over periods of time sufficient to guarantee completion, or various conventional analytical monitoring techniques can be employed to monitor progress of the forward reaction; such monitoring makes it possible to speed up the procedures somewhat, and to stop the reaction as soon as a product having the minimum acceptable composition is formed.

Appropriate monitoring techniques include measurement of relative and intrinsic viscosities, acid values, hydroxyl numbers, $^1$H and $^{13}$C nuclear magnetic resonance (nmr) spectra, and liquid chromatograms.

Most conveniently, when using a combination of volatile reactants (such as a glycol) and relatively involatile reactants (such as dimethyl terephthalate), the deaction will be initiated with excess glycol being present. As in the case of ester interchange reactions reported by Odian (op. cit.), "stoichiometric balance is inherently achieved in the last stages of the second step of the process". Excess glycol can be removed from the reaction mixture by distillation; thus, the exact amount used is not critical.

Typically herein, when calculating the relative proportions of reactants to be used, the following routine is followed, as illustrated for a combination of the reactants ethoxylated morpholine (A), 1,2-propylene glycol (B) and dimethylterephthalate (C):

1. the desired degree of end-capping (chain terminating) is selected; for the present example, the value 2, most highly preferred according to the invention, is used;
2. the average calculated number of terephthaloyl units and/or optional nonvolatile, e.g., poly(oxyethylene)oxy units, in the backbone of the desired ester are selected; for the present example, the value 3.75 for the terephthaloyl units, which falls in the range of most highly preferred values according to the invention, is used;
3. the mole ratio of (A) to (B) should thus be 2:3.75; amounts of the reactants (A) and (B) are taken accordingly;
4. an appropriate excess of glycol is selected; typically 1.5 to 10 times the number of moles of dimethyl terephthalate is suitable.

A selection of the ratios of the various reactants will be made in accordance with the desired ratios of the resulting moieties, etc., as set forth in the various Examples herein.

More generally herein, when preparing fully end-capped ester from "simple" reactants, a ratio of the moles of end-capping reactant to moles of all other nonglycol organic reactants (e.g., in the simplest case only dimethyl terephthalate) of from about 2:1 to about 1:20, most preferably about 1:1 to about 1:5 will be used. The glycol used will be calculated in an amount, in any event sufficient to allow interconnection of all other units by means of ester bonds, and adding a convenient excess will usually result in a total relative amount of glycol ranging from about 1.5 to about 10 moles for each mole of nonglycol organic reactants added together.

Other CPSRA's include the polyester compounds containing basic groups disclosed in U.S. Pat. No. 3,416,952, McIntyre et al., issued Dec. 17, 1968, incorporated herein by reference. These compounds include a polymer of dimethyl terephthalate, ethylene glycol and N,N-dimethylhydrazine (Example 3) which are said to have N,N-dimethylhydrazide cationic chain capping groups. There is no polyethylene glycol group present in this Example and a similar compound comprising at least one polyethylene glycol group would be more effective and easier to incorporate. The alleged block copolymer of poly(ethylene terephthalate) with poly-(ethylene-N-methyliminodiacetate) (Example 4), might have been effective if any substantial amount was formed, especially at a low pH where the carboxyl groups would have the formula —C(O)OH and act essentially as nonionic groups. However, it is believed that the reaction time was too short to prepare any reasonable amount of the block copolymer.

Other CPSRA's that can be used to prepare the compositions of the present inventions are polyesters having cationic quaternary or imidazolinium end groups, disclosed generically in U.S. Pat. No. 4,738,787, supra, incorporated herein by reference. In order to be truly effective, the polymers would have to be prepared with relatively low molecular weight, a clearly cationic character, and, preferably, only short chain groups at the end of the polymer. The cationic polymer Examples of the '782 patent, in general, are believed to have excessive molecular weights The long alkyl chains attached to the cationic groups also reduce the cationic charge effect.

In addition to the CPSRA, more conventional nonionic soil release polymers can also be present.

Liquid Carrier

The liquid carrier is selected from the group consisting of water and mixtures of the water and short chain $C_1$–$C_4$ monohydric alcohols. Water used can be distilled, deionized, or tap water. Mixtures of water and up to about 15% of a short chain alcohol such as ethanol, propanol, isopropanol or butanol, and mixtures thereof, are also useful as the carrier liquid.

Optional Ingredients

Adjuvants can be added to the compositions herein for their known purposes. Such adjuvants include, but are not limited to, viscosity control agents, perfumes, emulsifiers, preservatives, anti-foaming agents, antioxidants, bacteriocides, fungicides, brighteners, opacifiers, freeze-thaw control agents, shrinkage control agents, and agents to provide ease of ironing. These adjuvants, if used, are added at their usual levels, generally each of up to about 5% by weight of the composition.

Viscosity control agents can be organic or inorganic in nature. Examples of organic viscosity modifiers are fatty acids and esters, fatty alcohols, and water-miscible solvents such as short chain alcohols. Examples of inorganic viscosity control agents are water-soluble ionizable salts. A wide variety of ionizable salts can be used. Examples of suitable salts are the halides of the group IA and IIA metals of the Periodic Table of the Elements, e.g., calcium chloride, magnesium chloride, sodium chloride, potassium bromide, and lithium chloride. Calcium chloride is preferred. The ionizable salts are particularly useful during the process of mixing the ingredients to make the compositions herein, and later to obtain the desired viscosity. The amount of ionizable salts used depends on the amount of active ingredients used in the compositions and can be adjusted according to the desires of the formulator. Typical levels of salts used to control the composition viscosity are from about 20 to about 6,000 parts per million (ppm), preferably from about 20 to about 4,000 ppm by weight of the composition.

Examples of bacteriocides used in the compositions of this invention are glutaraldehyde, formaldehyde, 2-bromo-2-nitropropane-1,3-diol sold by Inolex Chemicals under the trade name Bronopol ®, and a mixture of 5-chloro-2-methyl-4-isothiazolin-3-one and 2-methyl-4-isothiazoline-3-one sold by Rohm and Haas Company under the trade name Kathon ® CG/ICP. Typical levels of bacteriocides used in the present compositions are from about 1 to about 1,000 ppm by weight of the composition.

Examples of antioxidants that can be added to the compositions of this invention are propyl gallate, available from Eastman Chemical Products, Inc., under the trade names Tenox ® PG and Tenox S-1, and butylated hydroxy toluene, available from UOP Process Division under the trade name Sustane ® BHT.

The present compositions can contain silicones to provide additional benefits such as ease of ironing and improved fabric feel. The preferred silicones are polydimethylsiloxanes of viscosity of from about 100 centistokes (cs) to about 100,000 cs, preferably from about 200 cs to about 60,000 cs. These silicones can be used as is, or can be conveniently added to the softener compositions in a preemulsified form which is obtainable directly from the suppliers. Examples of these preemulsified silicones are 60% emulsion of polydimethylsiloxane (350 cs) sold by Dow Corning Corporation under the trade name DOW CORNING ®1157 Fluid and 50% emulsion of polydimethylsiloxane (10,000 cs) sold by General Electric Company under the trade name General Electric ® SM 2140 Silicones. The optional silicone component can be used in an amount of from about 0.1% to about 6% by weight of the composition.

Other minor components include short chain alcohols such as ethanol and isopropanol which are present in the commercially available quaternary ammonium compounds used in the preparation of the present compositions. The short chain alcohols are normally present at from about 1% to about 10% by weight of the composition.

A preferred composition contains from about 0.2% to about 2% of perfume, from 0% to about 3% of polydimethylsiloxane, from 0% to about 0.4% of calcium chloride, from about 1 ppm to about 1,000 ppm of bacteriocide, from about 10 ppm to about 100 ppm of dye, and from 0% to about 10% of short chain alcohols, by weight of the total composition.

The pH of the compositions of this invention is generally adjusted to be in the range of from about 3 to about 7, preferably from about 3.5 to about 6, more preferably from about 3.5 to about 4. Adjustment of pH is normally carried out by including a small quantity of free acid in the formulation. Because no strong pH buffers are present, only small amounts of acid are required. Any acidic material can be used; its selection can be made by anyone skilled in the softener arts on the basis of cost, availability, safety, etc. Among the acids that can be used are hydrochloric, sulfuric, phosphoric, citric, maleic, and succinic. For the purposes of this invention, pH is measured by a glass electrode in water containing 10% of the softening composition in comparison with a standard calomel reference electrode.

The liquid fabric conditioning compositions of the present invention can be prepared by conventional methods. A convenient and satisfactory method is to prepare the softening active premix at from about 70° C. to about 85° C., which is then added with stirring to the hot water seat. The CPSRA can be added either to the molten softener premix, or added in molten state to the water seat before, or preferably after, the softener premix has been added. Temperature-sensitive optional components can be added after the fabric softening composition is cooled to a lower temperature.

The liquid fabric conditioning compositions of this invention are used by adding to the rinse cycle of conventional home laundry operations. Generally, rinse water has a temperature of from about 5° C. to about 60° C. The concentration of the fabric softener actives of this invention is generally from about 10 ppm to about 200 ppm, preferably from about 25 ppm to about 100 ppm, by weight of the aqueous rinsing bath.

In general, the present invention in its fabric softening method aspect comprises the steps of (1) washing fabrics in a conventional washing machine with a detergent composition; and (2) rinsing the fabrics in a bath which contains the above-described amounts of the fabric softeners; and (3) drying the fabrics. When multiple rinses are used, the fabric conditioning composition is preferably added to the final rinse. Fabric drying can take place either in an automatic dryer or in the open air.

In another aspect of this invention, soil release benefits are provided to, e.g., polyester fabrics by a method involving several sequential applications of the fabric conditioning compositions either with, or without, the fabrics being worn between treatments. The sequential treatments increase the ability of the polyester fabrics to be cleaned in the wash step, especially with respect to the removal of oily, greasy soils.

All percentages, ratios, and parts herein are by weight unless otherwise indicated.

Specific cationic polyester soil release agents useful in the present invention are prepared as follows:

PREPARATIVE EXAMPLE I

CPSRA 1

Oligomer Formed by Reacting Methyl 4-(dimethylamino)benzoate, Dimethyl Terephthalate, and 1,2-Propanediol Into a 250-ml, three-necked, round bottom flask equipped with magnetic stirrer, short distillation head, internal thermometer, and argon inlet for maintaining an inert atmosphere are placed the following: 20 g of methyl 4-(dimethylamino)benzoate (0.112 moles, Alpha Products), 29.9 g of dimethyl terephthalate (0.154 moles, Aldrich Chemical), 14.6 g of 1,2-propanediol (0.196 moles, Fisher Scientific), about 0.1 g of hydrated monobutyltin oxide (M&T Chemicals) and about 0.1 g of butylated hydroxytoluene (BHT) (Aldrich Chemical). The reaction mixture is heated to 170° C. with stirring for about 24 hours and then the temperature is raised to 85°-190° C. for about 18 hours during which time methanol is collected as a distillate. The reaction mixture is allowed to cool and then transferred to a single neck round bottom flask and placed on a Kugelrohr apparatus (Aldrich Chemical) at about 1 torr at 200° C. for 4 hours to give the desired oligomer. The $^1$H nmr (CDCl$_3$) shows peaks at 1.51 (d,12H), 4.56 (m,8H), and 5.6 (m,4H) ppm for doubly-esterified 1,2-propanediol. A singlet (12H) at 2.92 ppm for (CH$_3$)$_2$N and a doublet (4H) at 6.6 ppm for aromatic hydrogens confirm the inclusion of the 4-(dimethylamino)benzoyl group in the oligomer.

This CPSRA 1 has the following empirical formula presentation:

$$[(CAT)(L)]_2(AO)_{3.75}(T)_{2.75}$$

wherein:

(CAT) is 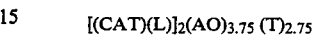

L is 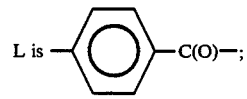

(AO) is $-O-CH_2-CH(CH_3)-O-$; and (T) is 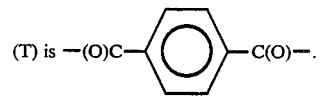

PREPARATIVE EXAMPLE II

CPSRA 2

Methobromide Quaternized Form of the Oligomer Formed by Reacting Methyl 4-(dimethylamino)benzoate, Dimethyl Terephthalate, and 1,2-Propanediol A 20 g sample of the named oligomer prepared as described above is placed in a glass autoclave liner with 100 ml of acetonitrile and 20 g of liquid methyl bromide (Matheson Gas). The reaction mixture is heated in an autoclave at 60° C. for 24 hours under 500 psig of nitrogen. The reaction mixture is cooled, poured into a round bottom flask and stripped of solvent and excess methyl bromide using a rotary evaporator to give the desired quaternized oligomer. Quaternization is confirmed by $^1$H nmr (d$^6$-DMSO) which shows the peak for (CH$_3$)$_2$N— at about 2.9 ppm has nearly disappeared and a new peak for (CH$_3$)$_3$N$^\oplus$ has appeared at about 3.6 ppm.

This CPSRA 2 has the same empirical formula as that of CPSRA 1, with the exception that (CAT) is 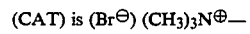

PREPARATIVE EXAMPLE III

CPSRA 3

Oligomer of Methyl 4-(dimethylamino)benzoated, Dimethyl Terephthalate, and 1,2-Propanediol, and Polyethylene Glycol (MW=600)

Into a 250-ml, three-necked, round bottom flask equipped with magnetic stirrer, short distillation head, internal thermometer, and argon inlet for maintaining an inert atmosphere are placed the following: 20 g of methyl 4-(dimethylamino)benzoate (0.112 mole, Alpha Products), 29.9 g of dimethyl terephthalate (0.154 mole, Aldrich Chemical), 14.6 g of 1,2-propanediol (0.196 mole, Fisher Scientific), 33.6 g of polyethylene glycol (MW=600, C.056 mole, Aldrich Chemical) about 0.1 g of hydrated monobutyltin oxide (M&T Chemicals) and about 0.1 g of BHT (Aldrich Chemical). The reaction mixture is heated to 170° C. with stirring for about 24 hours and then the temperature is raised to 185°-190° C. for about 18 hours during which time methanol is collected as a distillate. The reaction mixture is allowed to cool and then transferred to a single neck round bottom flask and placed on a Kugelrohr apparatus (Aldrich Chemical) at about 1 torr at 200° C. for 4 hours to give the desired oligomer. The $^1$H nmr (CDCl$_3$) shows peaks at 1.52 ppm (d, doubly esterified propanediol) and 3.02 ppm (s, for (CH$_3$)$_2$N—). The ratio observed for the two cited peaks is 1:1.06 compared with a theoretical ratio of 1:1.45 suggesting that a little of the 4-(dimethylamino)-benzoyl group has been lost as a volatile material.

This CPSRA 3 has the following empirical formula presentation:

[(CAT)(L)]$_2$ (AO)$_{2.75}$ (T)$_{2.75}$ (E$_{13}$)

wherein:

(CAT) is (CH$_3$)$_2$N—;

L is 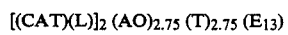

(AO) is —O—CH$_2$—CH(CH$_3$)—O—;

(T) is 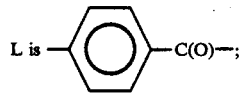

(E$_{13}$) is —O—(CH$_2$CH$_2$O)$_{13}$—.

PREPARATIVE EXAMPLE IV

CPSRA 4

Methobromide Quaternized Form of the Oligomer of Methyl 4-(dimethylamino)benzoate, Dimethyl Terephthalate, 1,2-Propanediol, and Polyethylene Glycol (MW=600)

A 20 g sample of the named oligomer prepared as described above is placed in a glass autoclave liner with 100 ml of acetonitrile and 20 g of liquid methyl bromide (Matheson Gas). The reaction mixture is heated in an autoclave at 60° C. for 24 hours under 500 psig of nitrogen. The reaction mixture is cooled, poured into a round bottom flask and stripped of solvent and excess methyl bromide using a rotary evaporator to give the desired quaternized oligomer. Quaternization is confirmed by $^1$H nmr (d$^6$-DMSO) which shows the peak for (CH$_3$)$_2$N at about 2.9 ppm has nearly disappeared. The resulting peak for (CH$_3$)$_3$N$^\oplus$ is under the large peak for the polyoxyethylene segments at about 3.7 ppm.

This CPSRA 4 has the same empirical formula as that of CPSRA 3, with the exception that (CAT) is (Br$^\ominus$) (CH$_3$)$_3$N$^\oplus$—

PREPARATIVE EXAMPLE V

CPSRA 5

Preparation of Alpha, Alpha'-[(2-Methoxyethylimino)di-2,1-Ethanediyl]bis-[omega-Hydroxypoly(Oxy-1,2-Ethanediyl)] with Average MW 515. (Ethoxylation of 2-Methoxyethylamine) [Reactant (1)]

A 500-ml, three-necked, round bottom flask is fitted with magnetic stirrer, condenser, internal thermometer, fritted gas inlet tube, and an argon inlet. The top of the condenser is connected to an acidic water trap for ethylene oxide. A 37.6 g (0.50) mole, Aldrich Chemical) portion of 2-methoxyethylamine is placed in the flask after sweeping with argon. Then ethylene oxide (Matheson Gas) is passed in as a gas with an initial reaction temperature of 75° C. The reaction is sufficiently exothermic that the temperature rises and a little of the starting amine is swept out into the trap. At this point the condenser is replaced with one cooled with solid CO$_2$. Ethoxylation continues with a temperature of about 70° C. until the proton nmr spectrum of an aliquot showed that 10 moles of ethylene oxide has reacted for each mole of starting amine. $^1$H nmr (CDCl$_3$) shows a triplet at 2.77 ppm for the 6 CH$_2$N hydrogens, a singlet at 3.30 ppm for methoxyl and a large peak at 3.6 ppm for all the other hydrogens on carbon. Reaction of an aliquot with an excess of trichloroacetyl isocyanate (Aldrich Chemical) creates two new triplets at 3.75 and 4.40 ppm in a ratio of about 1:2 indicating that about 2/3 of the hydroxyl groups are attached to a polyoxyethylene chain and the remaining ⅓ are present as hydroxyethyl groups on nitrogen.

Polymer of (1) Alpha,alpha'-[2-Methoxyethylimino)di-2,1-Ethanediyl]bis[omega-Hydroxypoly(Oxy-1,2-Ethanediyl] with Average MW 515 (Ethoxylated 2-Methoxyethylamine), (2) Alpha-Methyl-Omega-Hydroxypoly (Oxy-2-Ethanediyl) (MW=7501) [Poly(Ethylene Glycol) Methyl Ether], (3) Dimethyl Terephthalate, and (4) 1,2-Propanediol Into a 500-ml, three-necked, round bottom flask equipped with magnetic stirrer, internal thermometer, short distillation head, receiver, and argon inlet for maintaining an inert atmosphere, are placed the following: 26.2 g of ethoxylated 2-methoxyethylamine (0.051 moles prepared as described above), 15.0 g poly(ethylene glycol methyl ether) (MW TM 750) (0.020 moles, Aldrich Chemical), 31.0 g dimethyl terephthalate (0.16 moles, Aldrich Chemical), 16.2 g 1,2-propanediol (0.21 moles, Fisher Scientific) and 0.1 g of hydrated monobutyltin oxide (M&T Chemicals). The reaction mixture is gradually heated to 175° C. over 5 hours and held there over night during which time 9.3 g of distillate is collected. The temperature is then raised to 200° C. for 7.5 hours to produce a total of 10.3 g of distillate. The reaction mixture is allowed to cool to room temperature and is then transferred to a single necked flask and placed in a Kugelrohr apparatus (Aldrich Chemical) at about 1 torr and 200° C. for 4 hours to give the desired polymer. The completion of the polymerization is confirmed by the $^{13}$C nmr (d$^6$-dimethyl sulfoxide) which shows no remaining peaks at 60 ppm for the free hydroxyl group at the end of a polyoxyethylene chain and instead shows large peaks at 64.4 and 68.2 ppm for the esters of that type of hydroxyl group. The peak at 54.1 ppm for CH$_2$N is retained in the polymer.

This CPSRA 5 has the following empirical formula presentation:

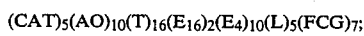

this presentation can be further idealized in the form

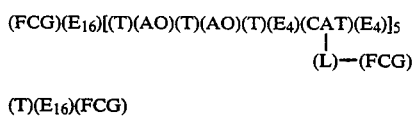

(T)(E$_{16}$)(FCG)

wherein

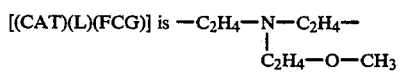

wherein
(CAT) is [—N(C$_2$H$_4$)$_2$],
(L) is —C$_2$H$_4$O—, and
(FCG) is —CH$_3$;
(AO) is —O—CH$_2$—CH(CH$_3$)—O—;

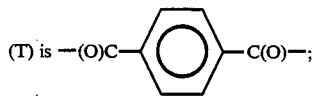

(E$_{16}$) is —O(-CCH$_2$CH$_2$O-)$_{16}$; and
(E$_4$) is —O(-CH$_2$CH$_2$O-)$_4$.

PREPARATIVE EXAMPLE VI

CPSRA 6

Methobromide Quaternized Form of the Polymer of (1)

Alpha,alpha'-[(2-Methoxyethylimino)di-2,1-Ethanediyl]bis[omega-Hydroxypoly (Oxy-1,2-Ethanediyl] with Average MW 515 (Ethoxylated 2-Methoxyethylamine), (2) Alpha Methyl-Omega-Hydroxypoly(oxy-1,2-Ethanediyl) (MW=750) [Poly(Ethylene Glycol Methyl Ether)], (3) Dimethyl Terephthalate, and (4) 1,2-Propanediol The above-named polymer CPSRA, prepared as described above, is placed in a 500-ml, three-necked, round bottom flask equipped with magnetic stirrer, fritted glass inlet tube, condenser, and argon inlet to maintain an inert atmosphere. A 250-ml portion of acetonitrile is added to dissolve the polymer and then an excess of methyl bromide (Matheson Gas) is added and the solution is allowed to stand over night. Solvent and excess methyl bromide are stripped off on a rotary evaporator and then on a Kugelrohr apparatus (Aldrich Chemical) at 50° C. and about 1 torr to give the quaternized form of the polymer. The $^1$H nmr (d$^6$-DMSO) shows that the multiplet which has been present in the starting material at about 2.58 ppm for the CH$_2$N groups has disappeared, thus confirming the quaternization has gone to completion.

This CPSRA 6 has the same empirical formula as that of CPSRA 5, with the exception that

PREPARATIVE EXAMPLE VII

CPSRA 7

Pre-preparation of Reactant (1)

Preparation of Alpha-Dimethylaminoethyl-Omega-Hydroxy-Poly (Oxy-1,2-Ethanediyl) with Molecular Weight 1277

A 1,000-ml, three-necked, round bottom flask is fitted with magnetic stirrer, internal thermometer, fritted glass gas inlet tube, and a condenser which is in turn topped with a fitting to both an argon source and (via a bubbler) a gas vent leading to a trap containing acidic water. The system is purged with argon and then 150.8 g (1.69 moles, Aldrich Chemical) of N,N-dimethylethanolamine is added. Then 22.3 g (0.97 mole, MCB) of sodium spheres are added in portions. The vigorous reaction heats the reaction mixture as high as 143° C. When the temperature falls to 130° C., ethylene oxide (Matheson Gas) is passed in as a gas through the fritted inlet below the level of the liquid as the remaining sodium dissolves. The rate of ethylene oxide addition is adjusted to maintain a reaction temperature in the range 100°-140° C. When the volume in the flask has increased to about 900 ml, one half of the product is withdrawn. (The degree of ethoxylation at this point is found to be about 12 by nmr.) The ethoxylation of the remainder of the material in the reaction flask is continued under the same conditions until the volume has again approximately doubled. About one half of the mixture is siphoned out at this point and mixed with 500 ml of water. Concentrated hydrochloric acid is added until the pH has dropped to approximately 3. (This takes 65 ml, 0.78 moles HCl.) The solution is further diluted to 3200 ml with distilled water and then extracted with 600 ml of methylene chloride which removes most of the color present. The aqueous layer is then made basic and salted out with 454.3 g of potassium carbonate and extracted with 600 ml of methylene chloride. The organic layer is dried over anhydrous potassium carbonate and then stripped of solvent on a rotary evaporator and then on a Kugelrohr apparatus (Aldrich Chemical) at 80° C. and about 1 torr for 4.5 hours to give 451 g of the desired ethoxylated amine as a light yellow oil. The $^1$H nmr (D$_2$O) shows a huge peak at 3.57 ppm for the ethoxyl chain, a small triplet at 2 47 ppm for —CH$_2$N and a singlet for the Me$_2$N— at 2.16 ppm. The integrated peak areas indicate that the total degree of ethoxylation is 28 for an average molecular weight of 1277. Higher degrees of ethoxylation could be obtained by simply continuing the addition of ethylene oxide longer before work-up.

Two Step Pre-Preparation of Reactant (2)

Step 1

Preparation of Glycol Terminated Propylene Terephthalate Oligomers

Into a 1000-ml, three-necked, round bottom flask equipped with magnetic stirrer, internal thermometer, short distillation head, receiver, and argon source for maintaining an inert atmosphere are placed 500 g (2.57 moles, Aldrich Chemical dimethyl terephthalate, 352.2 g (4.63 moles, Fisher Scientific) 1,2-propanediol, 1.0 g (0.0034 moles, Fisher Scientific) antimony trioxide, 1.0 g (0.0057 moles, MCB) calcium acetate monohydrate, and 1.0 g (0.0045 moles, Aldrich Chemical) BHT. The temperature of the mixture is raised over the course of an hour to 160° C. and held there over night as methanol distills from the system. Then the temperature is raised to 230 C over two hours and held there for two hours to give the desired oligomer. Alternatively, the oligomerization can be completed using a Kugelrohr apparatus (Aldrich Chemical) after the theoretical amount of methanol has been distilled out in which case a temperature of 170° C. at 1 torr for a few minutes is sufficient to achieve oligomerization and remove almost all free propylene glycol. The $^1$H nmr (d6-DMSO) shows several peaks in the 1.1–1.75 ppm range for the doubly and singly esterified propylene glycol methyls and a broad singlet at 8.15 ppm for the terephthalate groups. The ratio of these two areas allows calculation of the degree of oligomerization for low oligomers. In this case the degree of oligomerization is 2.13 (average terephthalates per molecule).

Step 2

Preparation of 4-(Chloromethyl)benzoyl-Capped Oligomer of 1,2-Propylene Terephthalate A 1000-ml, three-necked, round bottom flask is equipped with magnetic stirrer, condenser, dropping funnel, and argon inlet for maintaining an argon blanket. A 5.1 g (0.026 mole, Aldrich Chemical) portion of 4-(chloromethyl)benzoyl chloride in 10 ml of tetrahydrofuran (Baker) is placed in the flask along with 4.8 g (0.053 mole, Baker) pyridine. Then 5.1 g of the propene terephthalate oligomer (about 0.013 moles), prepared as above in Step 1 is dissolved in 40 ml of tetrahydrofuran and added dropwise to the reaction flask. A white precipitate begins to form almost immediately. The system is stirred at room temperature over night. An infrared spectrum at this point shows a significant acid chloride peak remaining at 1785 cm$^1$ and a peak at 3430 cm$^{-1}$ for hydroxyl. A 20-ml portion of the solution is withdrawn for other purposes and the remainder is heated at near reflux for about 24 hours. At this point the infrared spectrum shows the aforementioned peaks have almost completely disappeared. The reaction mixture is cooled and filtered and then stripped of solvent on a rotary evaporator to give a light brown oil. The oil is taken up in 150 ml of methylene chloride and washed three times with 25 ml portions of cold, 1N HCl. The methylene chloride solution is dried over sodium sulfate and stripped of solvent to give 1.7 g of the desired, capped oligomer as an oil. The $^1$H nmr spectrum shows a clean doublet at 1.4 ppm with only a trace of any peak in the 1–1.3 ppm region indicating that the propylene glycols are now all present as diesters. The aromatic region shows a broad singlet at 7.93 for terephthalates partially overlapping a pair of doublets at 7.39 and about 7.85 for the chloromethylbenzoyl group. Analysis of the aromatic peak areas indicates that the ratio of chloromethylbenzoyl to terephthaloyl groups is 2:2.25 in good accord with the expected 2:2.13 ratio.

Diquaternary Oligomer from (1) Alpha-Dimethylaminoethyl-Omega-Hydroxy-Poly(Oxy-1,2-Ethanediyl) of Molecular Weight 1277 and (2) 4-(Chloromethyl)benzoyl-Capped Oligomer of 1,2-Propylene Terephthalate A 1.4 g portion of the named chloromethylbenzoyl capped oligomer (0.0018 moles) prepared as above is mixed with 4.6 g (0.0036 mole) of the named ethoxylated amine and 20 ml of acetonitrile in a 50-ml, round bottom flask equipped with magnetic stirrer, condenser, and argon inlet to maintain an inert atmosphere. The solution is heated under reflux for about three days. Stipping of solvent leaves the desired quaternized oligomer. The $^1$H nmr (CDCl$_3$) shows a broad singlet at 3.2 ppm for the methyl groups on quaternary nitrogen and a smaller peak at 2.36 for methyls on unquaternized nitrogen (probably partially protonated since totally free amine is expected at about 2.2 ppm) The $^{13}$C nmr (CDCl$_3$) likewise shows peaks at 50.7 ppm and a smaller one at 45 ppm, respectively, for the same two groups.

This CPSRA 7 has the following empirical formula presentation:

[(FCG)(E$_{27}$)(CAT)(L)]$_2$(AO)$_{3.13}$(T)$_{2.13}$ wherein
[(FCG)(E$_{28}$)(I)(L)] is

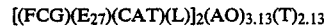
(Cl$^-$) H(OCH$_2$CH$_2$)$_{27}$—N$^⊕$—(CH$_3$)$_2$—CH$_2$——C(O)— wherein
(FCG) is H
(E$_{27}$) is -(OCH$_2$CH$_2$)$_{27}$,
(CAT) is [C$_2$H$_4$—N$^⊕$(CH$_3$)$_2$—]Cl$^⊖$,

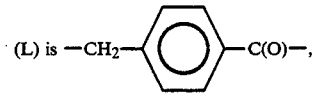
(L) is —CH$_2$—◯—C(O)—,

C(O)—,
(AO) is —O—CH$_2$—CH(CH$_3$)—O—, and

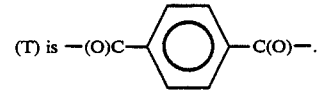
(T) is —(O)C—◯—C(O)—.

PREPARATIVE EXAMPLE VIII

CPSRA 8

Step 1

Preparation of Oligomer of 1,2-Propanediol and Terephthaloyl Chloride

A 40.6 g (0.20 moles, Aldrich Chemical) portion of terephthaloyl chloride is dissolved in 300 ml of dry tetrahydrofuran (Baker) in a 1-liter, three-necked, round bottom flask equipped with addition funnel, magnetic stirrer, condenser, and argon inlet to maintain an inert atmosphere. To this solution is added a tetrahydrofuran solution containing 9.7 g (0.127 moles, Fisher Scientific) of 1,2-propanediol and 25.7 g (0.254 moles, Aldrich Chemical) of triethylamine each of which has been pre-dried over molecular sieves. The reaction mixture is stirred over night during which time a heavy white precipitate forms. The solvent is then stripped off on a rotary evaporator and the resulting residue is stirred with 800 ml of absolute ether. The solid is removed by filtration and the ether is stripped off first on a rotary evaporator and then the last traces are removed on a Kugelrohr apparatus (Aldrich Chemical) at 60° C. and about 1 torr for 7 hours. This leaves 35.1 g of the desired oligomer as the residue. The $^1$H nmr spectrum (CDCL$_3$) shows a clean doublet at 1.47 ppm indicating that all the propanediol has been doubly esterified. The $^{13}$C nmr spectrum (CDC13) shows a single peak in the 15–25 ppm region at 16.5 ppm again showing that all the diol is doubly esterified. A cluster of peaks at 164.5–165.2 for ester carbonyls and a single peak at 167.6 ppm for acid chloride carbonyl are all consistent with the desired structure.

Step 2

Preparation of Dimethylaminopropylamido-Terminated Oligo (Propylene Terephthalate)

A 4.8 g (0.0085 moles) portion of the oligomer of 1,2-propanediol and terephthaloyl chloride prepared in a way similar to that described above is placed in a 50-ml, three-necked, round bottom flask equipped with magnetic stirrer, condenser dropping funnel, and thermometer along with 10 ml of methylene chloride. To this is added in portions, 1.7 g (0.017 moles, Aldrich Chemical) of 3-dimethylaminopropylamine. The ensuing reaction warms the reaction mixture to the reflux point. Stirring is continued over night at room temperature. A sample taken for IR analysis shows a small remaining peak at 1790 cm$^{-1}$ indicating some unreacted acid chloride. Additional 3-dimethylaminopropylamine is added in portions until no more acid chloride can be detected. (This requires about 35 drops.) The reaction mixture is diluted to about 125 ml with distilled water and 1.2 g (0.0087 moles) of potassium carbonate is dissolved in the aqueous phase. Shaking leads to emulsification. Additional methylene chloride is added to break the emulsion and the separated methylene chloride layer is dried over anhydrous sodium sulfate. Stripping the solvent on the rotary evaporator at 60° C. gives 3.7 g of the desired amine functionalized oligomer as a brown, oily solid. A proton nmr (CDCl$_3$, shaken with D$_2$O to remove exchangeable protons) shows a large singlet at 2.13 ppm for the dimethylamino moiety, a triplet at 3.4 ppm for —CH$_2$NHC=O, and a doublet persisting at 1.38 ppm for double esterified propanediol (indicating no hydrolysis occurs). The ratio of aromatic protons to protons on the (CH$_3$)$_2$NCH$_2$— moiety indicates that the ratio of terephthalate groups to tertiary amine groups is 1.61:1. The theoretical ratio is 1.37:1. This indicates that the extraction has been somewhat selective for the larger oligomers.

Step 3

Quaternization of Dimethylaminopropylamine-Terminated Oligo(Propylene Terephthalate)

A 3.3 g portion of the named oligomer prepared as described above is placed in a 500-ml, three-necked, round bottom flask equipped with magnetic stirrer, solid CO$_2$ condenser, fritted glass inlet tube for introducing gas, and a gas exit tube on top of the condenser. A 100-ml portion of acetonitrile is added and then methyl bromide (Matheson Gas) is passed in large excess raising the level of the liquid in the flask by about ½ inch. The clear, yellow solution gradually begins to separate a second liquid phase. The system is allowed to stand over night at room temperature. Stripping the solvent on a rotary evaporator leaves a yellow solid. The $^1$H nmr in D$_2$O is broad and not easily interpreted. As a precaution the sample is retreated by dissolving again in acetonitrile and adding an excess of methyl bromide. As the methyl bromide is added the initially clear solution becomes cloudy. A check of the apparent pH using Hydrion ® paper indicated pH 6, so a small amount of solid potassium carbonate is added to ensure that any unquaternized amine is not protonated. The system is then allowed to stand for three days at room temperature. It is then filtered and the filtrate is stripped on the rotary evaporator to give the desired quaternized oligomer as a yellow solid. This time the nmr spectrum is obtained in methanol-d$^4$ which gives well-defined peaks including a strong singlet at 3.0 ppm for Me$_3$N$^+$ and a multiplet in the 7.65–7.85 region for the aromatic protons in a 1.32:1 ratio indicating that the ratio of terephthalate to Me$_3$N— groups is 1.7:1 (or 3.4:2), essentially what is expected based on the starting dimethylamino-capped oligomer used.

This CPSRA 8 has the following empirical formula presentation:

$$[(CAT)(L)]_2(T)[(AO)(T)]_{2.4}$$

wherein

[(CAT)(L)] is (Br$^\ominus$) (CH$_3$)$_3$N$^\oplus$C$_3$H$_6$NH— wherein
(CAT) is (CH$_3$)$_3$N$^\oplus$—(Br$^\ominus$),
(L) is —C$_3$H$_6$—NH—,
(AO) is —O—CH$_2$—CH(CH$_3$)—O—, and (T) is 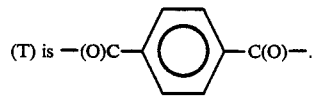.

PREPARATIVE EXAMPLE IX

CPSRA 9

Pre-Preparation of Reactant (1)

Ethoxylation of 4-(2-Hydroxyethyl)moroholine

A 48 g (0.37 moles) portion of Aldrich Chemical 4-(2-hydroxyethyl)morpholine is placed in a 500-ml, three-necked, round bottom flask fitted with magnetic stirrer, thermometer, fritted gas inlet tube for ethylene oxide, condenser, and argon inlet for maintaining an inert atmosphere. A 1.0 g (0.04 moles, Aldrich Chemical) portion of sodium hydride is added with stirring. When the hydride has all reacted, the temperature is raised to 100° C. with an oil bath and ethylene oxide (Matheson Gas) is passed in as a gas at a rate which maintains the temperature at about 100° C. when the heat to the oil bath is turned off. After about four hours the reaction flask contents has increased in weight by 197 g indicating that the average degree of ethoxylation (including) the one original hydroxyethyl group) is 13. (Higher degrees of ethoxylation are obtained by simply continuing the ethoxylation for a longer time.) The alkoxide is neutralized by adding 2.4 g (0.04 moles) of glacial acetic acid. As a precaution, the product is then stripped on a Kugelrohr apparatus (Aldrich Chemical) at 100° C. and ca. 1 torr for two hours to remove any volatiles.

Synthesis of an Oligomer from (1) Ethoxylated Morpholine (With Degree of Ethoxylation=13), (2) Dimethyl Terephthalate, and (3) Ethylene Glycol Into a 500-ml, three-necked, round bottom flask equipped with magnetic stirrer, short distillation head, receiver, internal thermometer, and argon inlet for maintaining an inert atmosphere are placed the following:
100 g (0.15 moles) ethoxylated morpholine with degree of ethoxylation TM 13 prepared as described above;
40.8 g (0.21 moles) dimethyl terephthalate (Aldrich Chemical);
16.3 g (0.26 moles) ethylene glycol (Fisher Scientific); and
0.2 g hydrated monobutyltin oxide (M&T Chemical).

The reaction mixture is gradually heated to 175° C. and held there over night as methanol distills from the system. The temperature is then gradually raised to 220° C. over about seven hours and then the system is cooled. The product is then transferred to a 500-ml, one-necked, round bottom flask and placed on a Kugelrohr apparatus (Aldrich Chemical) at about 1 torr and the temperature is raised to 200° C. over one hour and held there for four hours. Cooling gives the desired oligomer. Carbon nmr (CDCl$_3$) shows the expected very large peak for the polyoxyethylene moiety at 69.8 ppm and a large peak at 63.8 ppm for the ester of the —(OCH$_2$CH$_2$)$_n$OH end group. The near absence of a peak at 60.7 ppm for free —(OCH$_2$CH$_2$)$_n$OH confirms that the polyesterification has proceeded to a high degree of completion. Large peaks at 53.3 66.0 ppm confirm that the morpholine ring remains intact.

This CPSRA 9 has the following empirical formula presentation:

[(CAT)(L)]$_2$(AO)$_{1.8}$(T)$_{2.8}$(E$_{12}$)$_2$ which can be further idealized in the form (CAT)(L)(E$_{12}$)[(T)(AO)]$_{1.8}$(T)(E$_{12}$)(L)(CAT)

wherein

(L) is —CH$_2$CH$_2$—,
(AO) —OCH$_2$CH$_2$O—,

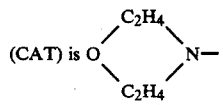

(E$_{12}$) is —O—(CH$_2$CH$_2$O)$_{12}$—,

PREPARATIVE EXAMPLE X

CPSRA 10

Quaternization of the Oliogmer of Ethoxylated Morpholine, Dimethyl Terephthalate, and Ethylene Glycol (CPSRA 9) Using Methyl Bromide A 30 gram sample of the above oligomer is dissolved in about 400 ml of acetonitrile in a 1-liter, round bottom flask and an excess of methyl bromide (Matheson Gas) is passed into the solution as a gas. A mild exotherm is noted, The flask is then stoppered and kept at room temperature overnight. The solvent and excess methyl bromide are then stripped off on a rotary evaporator at 60° C. and about 1 torr. This gives the desired quaternized oligomer in quantitative yield. Carbon nmr (CDCl$_3$) shows a new peak at 48.7 ppm for methyl on a quaternized nitrogen. The peak at 53.3 ppm in the starting oligomer for the —CH$_2$NCH$_2$— moiety of the morpholine ring has completely disappeared showing that the conversion to the quaternary form is complete.

This CPSRA 10 has the same empirical formula as that of CPSRA 9, with the exception that

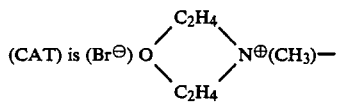

PREPARATIVE EXAMPLE XI

CPSRA 11

Quaternization of the Oligomer Formed from Ethoxylated Morpholine (with degree of ethoxylation=13), Dimethyl Terephthalate, and Ethylene Glycol (CPSRA 91) Using 1,4-Diiodobutane A 7.2 g (0.004 moles) portion of the above named oligomer is mixed with 1.24 g (0.004 moles) of 1,4-diiodobutane (Aldrich Chemical) in a small round bottom flask and the system is heated under argon in an oil bath at 100° C. for a total of 11 hours. $^{13}$C nmr shows the starting material peaks at 53.3 and 66 ppm for the morpholine ring has completely disappeared indicating that the quaternization has gone to completion.

This CPSRA 11 has the following empirical formula presentation:

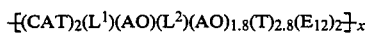

this presentation can be further idealized in the form

{(CAT)(L$^1$)(E$_{12}$)[(T)(AO)]$_{1.8}$(T)(E$_{12}$)(L$^1$)-(CAT)(L$^2$)}$_x$ wherein:

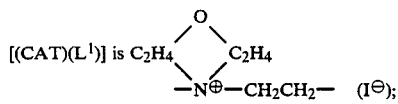

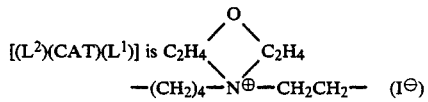

wherein (L$^2$) is —(CH$_2$)$_4$—, and (L$^1$) is —(CH$_2$)$_2$—;
wherein the two "R" groups in (CAT) are joined to form a morpholino ring structure;
(AO) is —OCH$_2$CH$_2$O;

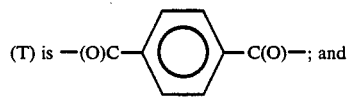

(E$_{12}$) is —O—(CH$_2$CH$_2$O)$_{12}$—.

PREPARATIVE EXAMPLE XII

CPSRA 12

Quaternization of the Oligomer Formed from Ethoxylated Morpholine (with degree of ethoxylation=13). Dimethyl Terephthalate, and Ethylene Glycol (CPSRA 9) using 1,6-Dibromohexane A 7.2 g (0.004 moles) portion of the above named oligomer is mixed with 0.98 g (0.004 moles) of 1,6-dibromohexane (Aldrich Chemical) and 0.12 g (0.0008 moles) of sodium iodide (Aldrich Chemical) in a small round bottom flask and the system is heated under argon in an oil bath at 100° C. for a total of 30 hours. $^{13}C$ nmr shows the starting material peaks at 53.3 and 66 ppm for the morpholine ring have almost completely disappeared indicating that the quaternization has gone to a high level of completion.

This CPSRA 12 has the same empirical formulae representation as CPSRA 11, with the exception that $(L^2)$ is $-(CH_2)_6-$ and

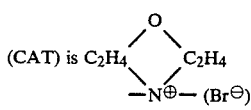

PREPARATIVE EXAMPLE XIII

CPSRA 13

Oligomer of Ethoxylated Morpholine (Degree of Ethoxylation=421) Dimethyl Terephthalate, and Ethylene Glycol A 100 g (0.051 moles) portion of the product obtained by Ethoxylating 4-(2-hydroxyethyl)morpholine to a total average degree of ethoxylation of 42 (as described above) is placed in a 500-ml, three-necked flask equipped with magnetic stirrer, thermometer, short distilling head, receiver, and argon inlet to maintain an inert atmosphere. A 13.6 g (0.070 moles) portion of dimethyl terephthalate, a 5.5 g (0.089 moles) portion of ethylene glycol (Fisher Scientific) and a 0.2 g portion of hydrated monobutyltin oxide (M&T Chemicals) are added to the system. The temperature is slowly raised to 175° C. with stirring and held there overnight. Then the temperature is slowly raised to 200° C. and held there for a total of 18 hours. The reaction mixture is transferred to a single neck, 500-ml round bottom flask and then placed on a Kugelrohr apparatus (Aldrich Chemical) at 200° C. and about 1 torr for 3.5 hours to give the desired oligomer. $^{13}C$ nmr (CHCl$_3$) shows a huge peak at 69.5 for the polyoxyethylene moieties, good sized peaks at 65.7 and 53.0 ppm for the morpholine moieties and a peak at 62.1 ppm for doubly esterified ethylene glycol. The near absence of any peaks in the range of 58-61 ppm showed that essentially all of the $-(OCH_2CH_2)_nOH$ groups have been esterified and that there are essentially no monoesters of ethylene glycol remaining.

This CPSRA 13 has the following empirical formula presentation:

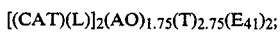

which can be further idealized in the form

wherein

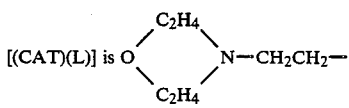

wherein
(L) is $-CH_2CH_2-$,
(AO) is $-OCH_2CH_2O$,

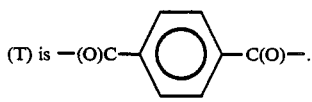

$(E_{41})$ is $-O-(CH_2CH_2O)_{41}-$.

PREPARATIVE EXAMPLE XIV

CPSRA 14

Quaternization of the Oligomer of Ethoxylated Morpholine (degree of ethoxylation=42), Dimethyl Terephthalate, and Ethylene Glycol (CPSRA 13) using Methyl Bromide A 30 g portion of the above named oligomer is dissolved in 400 ml of acetonitrile in a 1-liter flask. Then methyl bromide (Matheson Gas) is passed in until a substantial excess is present. The flask is stoppered and allowed to stand overnight at room temperature. The solvent and excess methyl bromide are stripped off with a rotary evaporator to give the desired quaternized oligomer. A new peak in the $^{13}C$ nmr spectrum (CDCl$_3$) at 48.7 ppm confirms the methyl on quaternized nitrogen. Similarly, the complete disappearance of the original morpholine ring peaks at 53.3 and 66.0 ppm shows that the quaternization is complete.

This CPSRA 14 has the same empirical formula as that of CPSRA 13, with the exception that

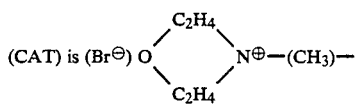

PREPARATIVE EXAMPLE XV

CPSRA 15

Step 1
Preparation of Chloroacetyl Milease TL

An amount of 10 g chloroacetyl chloride is added with stirring into a 2-liter conical flask fitted with a magnetic stirrer and a reflux condenser capped with a CaCl$_2$ tube, containing a solution of 127 g Milease TL (previously dried in vacuum over at 70° C. over P$_2$O$_5$ in 1 liter of methylene chloride and 6.2 g of pyridine (previously dried over KOH and distilled). The reaction mixture is stirred for 16 hours, then the resulting methylene chloride solution is dried over sodium sulfate, filtered and evaporated down on a rotary vacuum evaporator.

Milease TL is a low molecular weight nonionic block cooligomer of poly(ethylene terephthalate) and polyoxyethylene terephthalate, said cooligomer containing (oxyethylene)oxy, terephthaloyl, and poly(oxyethylene)oxy groups, where said poly(oxyethylene)oxy groups contain about 34 oxyethylene units on the average. $^{13}$C nmr and viscosity data show that the Milease TL sample used in this preparation of CPSRA 15 contains on the average about 3 oxyethyleneoxy groups, about 4 terephthaloyl groups, and about 2 poly(oxyethylene)oxy groups, with an average molecular weight of about 3734.

Step 2

Quaternization of Chloroacetyl Milease TL

The sample of chloroacetyl Milease TL prepared as described above is dissolved in 1 liter of sodium-dried toluene in a 2-liter round bottom flask fitted with a magnetic stirrer and a reflux condenser capped with a CaCl$_2$ tube and the stirred toluene solution is cooled by means of an ice bath. An amount of 100 ml of precooled (about $-10°$ C.) trimethylamine is then added to the toluene solution and the reaction mixture is stirred for two hours at iced-bath temperature. The condenser is then removed, the flask is sealed and allowed to stand at room temperature for about 64 hours. The flask is then cooled in an ice bath, opened, allowed to warm to room temperature, and nitrogen gas is bubbled through, with stirring to expel the excess trimethylamine. The solvent of the resulting mixture is evaporated on a rotary vacuum evaporator. The dry solid is dispersed in 2 liters of diethyl ether, recovered by Buchner filtration, and dried over P$_2$O$_5$ in a vacuum dessicator to yield 104 g of the desired CPSRA 15.

This CPSRA 15 has the following empirical formula representation:

[(CAT)(L)]$_2$(AO)$_3$(T)$_4$(E$_n$)$_2$ wherein

[(CAT)(L)] is (Cl$^\ominus$)(CH$_3$)$_3$N$^\oplus$—CH$_2$—C(O)— wherein (L) is —CH$_2$C(O)—, (AO) is —OCH$_2$CH$_2$O—,

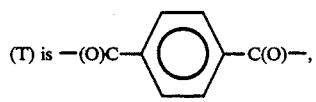

(T) is —(O)C—⟨phenyl⟩—C(O)—, (E$_n$) is —O—(CH$_2$CH$_2$O)$_{34}$—, and the CPSRA has an average molecular weight of about 4,000.

PREPARATIVE EXAMPLE XVI

CPSRA 16

Polymer of Monomethyl-Capped Polyethylene Glycol, Dimethyl Terephthalate, and 3-Morpholino-1,2-Propanediol Into a 500-ml, round bottom flask are placed the following:

56 g of monomethyl-capped polyethylene glycol, MW 750, Union Carbide (0.066 mole);
17.6 g of dimethyl terephthalate, Aldrich Chemical, (0.090 moles);
19.2 g of 3-morpholino-1,2-propanediol, Aldrich Chemical, (0.116 moles);
0.5 g of antimony trioxide, Fisher Scientific;
0.5 g of calcium acetate dihydrate; and
0.5 g of BHT, Aldrich Chemical.

The flask is fitted with magnetic stirrer, short distillation head, receiver, thermometer and argon inlet to maintain an inert atmosphere. The reactants are heated gradually to 180° C. and held there for about 24 hours during which time 5.5 g of distillate is collected (mostly methanol). The reaction mixture is then allowed to cool under argon and placed on a Kugelrohr apparatus (Aldrich Chemical) at about 1 torr and the temperature is gradually raised to 200 ° C. and held there for about 5.5 hours to give the desired oligomer. Carbon nmr in CDCl$_3$ shows peaks at 53.6 and 66.5 ppm confirming that the morpholine group is present. In addition, a peak at 58.5 for the methyl cap is present but no peak for the free end group —OCH$_2$CH$_2$OH remains at ca. 61 ppm indicating that the polyesterification has gone to a good level of completion.

The target molecular weights (MW), target charge (Z), calculated molecular weight per charge (MW/Z), calculated molecular weight of the (AO)(T) portion of the CPSRA's and the estimated percent of the total molecular weight represented by said (AO)(T) portion are summarized in Table 1.

TABLE 1

| CPSRA | MW | Z | MW/Z | (AO) (T) | MW (AO) (T) as % of Total MW |
|---|---|---|---|---|---|
| 1 | 937 | 2 | 468 | 640.5 | 68 |
| 2 | 1127 | 2 | 563 | 640.5 | 57 |
| 3 | 1451 | 2 | 725 | 566.5 | 39 |
| 4 | 1641 | 2 | 820 | 566.5 | 35 |
| 5 | 6887 | 5 | 1377 | 2852 | 41 |
| 6 | 7362 | 5 | 1472 | 2852 | 39 |
| 7 | 3374 | 2 | 1687 | 513 | 15 |
| 8 | 1018.4 | 4 | 255 | 626.4 | 62 |
| 9 | 1794 | 2 | 897 | 477.6 | 27 |
| 10 | 1984 | 2 | 992 | 477.6 | 24 |
| 11 | 2104x | 2x | 1052 | 477.6 | 23 |
| 12 | 2038x | 2x | 1019 | 477.6 | 23 |
| 13 | 3868 | 2 | 1931 | 468 | 12 |
| 14 | 4058 | 2 | 2029 | 468 | 12 |
| 15 | 4005 | 2 | 2003 | 708 | 18 |
| 16 | 2111 | 2 | 1200 | — | — |

Examples of Fabric Conditioning Compositions

Nonlimiting examples and comparative examples of fabric conditioning compositions are given in Table 2 to illustrate the advantage of the present invention.

TABLE 2

| Ingredients | Ex. 1 | Ex. 2 | Comparative Ex. 3 | Comparative Ex. 4 |
|---|---|---|---|---|
| Ditallowdimethyl-ammonium chloride (DTDMAC) | 4.5 | 4.5 | 4.5 | 4.5 |
| CPSRA 9 | 1.5 | — | — | — |
| CPSRA 10 | — | 1.5 | — | — |
| Nonionic Soil Release Polymer (a) | — | — | 1.5 | — |
| Perfume | 0.4 | 0.4 | 0.4 | 0.4 |
| PDMS (b) | 0.18 | 0.18 | 0.18 | 0.18 |
| Minor ingredients (c) | 0.074 | 0.074 | 0.074 | 0.074 |
| Deionized Water | Balance 100% | Balance 100% | Balance 100% | Balance 100% |

| Ingredients | Ex. 5 | Comparative Ex. 6 | Comparative Ex. 7 |
|---|---|---|---|
| Ditallowdimethyl-ammonium chloride (DTDMAC) | 4.5 | 4.5 | 4.5 |
| CPSRA 15 | 1.5 | — | — |
| Milease TL (d) | — | 1.5 | — |
| Perfume | 0.4 | 0.4 | 0.4 |
| Minor ingredients (e) | 0.031 | 0.031 | 0.031 |

TABLE 2-continued

| Deionized Water | Balance 100% | Balance 100% | Balance 100% |
|---|---|---|---|
| Ingredients | Ex. 8 | Comparative Ex. 9 | Comparative Ex. 10 |
| Ditallowdimethyl-ammonium chloride (DTDMAC) | 2.65 | 2.65 | 2.65 |
| Amine (f) | 2.20 | 2.20 | 2.20 |
| Monotallowtri-methylammonium chloride (MTTMAC) | 1.20 | 1.20 | 1.20 |
| CPSRA 15 | 1.65 | — | — |
| Milease TL (d) | — | 1.65 | — |
| Perfume | 0.44 | 0.44 | 0.44 |
| Minor ingredients (e) | 0.025 | 0.025 | 0.025 |
| HCl | to pH 5 | to pH 5 | to pH 5 |
| Deionized Water | Balance 100% | Balance 100% | Balance 100% |

(a) This nonionic soil release polymer is prepared according to the procedure of Example 1 of U.S. Pat. No. 4,702,857, E. P. Gosselink, issued Oct. 27, 1987, said patent being incorporated herein by reference.
(b) Polydimethylsiloxane emulsion containing 55 wt. % of a polydimethylsiloxane having a viscosity of about 350 centistokes.
(c) Bacteriocide, antioxidant, antifoam, etc.
(d) Nonionic cooligomer described in the preparation of CPSRA 15.
(e) Bacteriocide, antioxidant, antifoam, and polydimethylsiloxane emulsion containing 55 wt. % of a polydimethylsiloxane having a viscosity of about 350 centistokes.
(f) 1-tallowamidoethyl-2-tallowimidazoline.

The above Examples and Comparative Examples are made as follows.

EXAMPLE 1

The composition of Example 1 is made by adding molten DTDMAC (at about 75° C.) with high shear mixing to a mixing vessel containing deionized water and antifoaming agent, heated to about 45° C. When the mixture has been thoroughly mixed, molten CPSRA 9 (at about 75° C.) is then added with high shear mixing. Finally other minor ingredients (antioxidant, bacteriocide, polydimethylsiloxane emulsion, and perfume) are added with mixing.

EXAMPLE 2 AND COMPARATIVE EXAMPLE 3

The compositions of Example 2 and Comparative Example 3 are made similarly to that of Example 1, except that CPSRA 10 and the nonionic soil release polymer, respectively, are used.

COMPARATIVE EXAMPLE 4

The composition of Comparative Example 4 is made similarly to that of Example 1, but no soil release agent is added.

EXAMPLE 5 AND COMPARATIVE EXAMPLE 6

The compositions of Example 5 and Comparative Example 6 are made similarly to that of Example 1, except that CPSRA 15 and Milease TL, respectively, are used.

COMPARATIVE EXAMPLE 7

The composition of Comparative Example 7 is made similarly to that of Example 5, but no soil release agent is added.

EXAMPLE 8 AND COMPARATIVE EXAMPLE 9

The compositions of Example 8 and Comparative Example 9 are made, each by first melting and mixing 1-tallowamidoethyl-2-tallowimidazoline, molten at about 85° C., to a mixture of DTDMAC and monotallowtrimethylammonium chloride, molten at about 75° C., in a premix vessel. This premix is then added with high shear mixing to a mix vessel containing deionized water and antifoaming agent, heated to about 45° C. A small amount of concentrated HCl is added to adjust the pH of the compositions to about pH 5.0. CPSRA 15 and Milease TL, respectively, molten at about 75° C., are then added with high shear mixing. Finally other minor ingredients (antioxidant, bacteriocide, polydimethylsiloxane emulsion, and perfume) are added with mixing.

COMPARATIVE EXAMPLE 10

The composition of Comparative Example 10 is made similarly to that of Example 8, but no soil release agent is added.

In the above Examples and Comparative Examples, the molten soil release agents can alternatively be added to the molten softeners (or the soil release agents and softeners comelted and blended together), instead of being added to the water phase. Both processes give compositions containing cationic soil release agents which provide a better soil release performance, relative to either compositions containing nonionic soil release agents or compositions without soil release agent, as discussed hereinbelow.

The compositions of Examples 1 and 2 containing CPSRA 9 and CPSRA 10 provide better soil release performance than the composition of Comparative Example 3 which contains a nonionic SRA that has the same basic molecular structure as the CPSRA's, but without the cationic end capping groups. This nonionic SRA is prepared according to the procedure of Example 1 of U.S. Pat. No. 4,706,857, supra. In turn the composition of Comparative Example 3 provides a better soil release performance than the composition of Comparative Example 4 which does not contain any SRA.

Compositions of Examples 5 and 8, respectively, containing CPSRA 15 provide better soil release performance than the compositions of Comparative Examples 6 and 9, respectively, which contain the parent nonionic SRA having the same basic molecular structure as the CPSRA, but without the cationic end capping groups. In turn, the compositions of Comparative Examples 6 and 9, respectively, provide a better soil release performance than the compositions of Comparative Examples 7 and 10, respectively, which do not contain any SRA.

What is claimed is:

1. Compound useful as cationic polymeric soil release agent having the generic empirical formula:

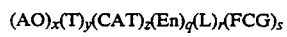

$(AO)_x(T)_y(CAT)_z(En)_q(L)_r(FCG)_s$ wherein:
(I) Each (AO) represents an oxyalkyleneoxy group, excluding oxyalkyleneoxy groups of $(E_n)$, containing from 2 to about 6 carbon atoms, and each "x" is from about 1 to about 80.
(II) Each (T) represents a terephthaloyl group and each "y" is from about 1 to about 80;
(III) Each (CAT) represents a cationic group comprising at least one moiety selected from the group consisting of:

$(R)_mN(-)_{3-m}$ wherein each "m" is from 0 to 2;

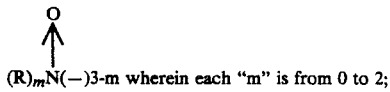

(R)$_m$N(—)$_{3-m}$ wherein each "m" is from 0 to 2;

wherein each R group is selected from the group consisting of C$_{1-4}$ alkyl groups, C$_{1-4}$ hydroxyalkyl groups, C$_{2-4}$ alkylene groups, C$_{2-4}$ oxyalkylene groups, phenyl, phenyl C$_{1-4}$ alkyl groups, hydrogen, wherein two R groups can be joined to form cyclic structures, and wherein each A$^\ominus$ is any compatible anion, and each "z" is selected from 1 to about 100 to provide the cationic charge to the polymer;

(IV) Each (E$_n$) represents a poly(oxyethylene)oxy group —(OCH$_2$CH$_2$)$_n$O— wherein each "n" is from 2 to about 200, and each q is less than about 25;

(V) Each (L), when present, represents a linking group comprising at least one hydrocarbylene group having from 2 to about 4 covalent bonds and containing from one to about 10 carbon atoms and 0 to 4 groups selected from the group consisting of:

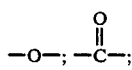

—O—; —C—;

and mixtures thereof and each "r" is a number from 0 to about 40; and (VI) Each Formula Completing Group (FCG), when present, is selected from the group consisting of: (a) H—; (b) —OH; (c) C$_{1-18}$ alkyl, alkoxy, or hydroxy alkyl groups, except that when the molecular weight of the compound is above about 10,000, the maximum number of carbon atoms that is in each FCG is about 4; (d) —C(O)OH, and (e) anionic groups neutralized with a compatible cation, and each "s" is a number from to a number sufficient to complete the formula;

and wherein the molecular weight of the compound is less than about 50,000, the net cationic charge of the compound is at least about one per 15,000 molecular weight units and the compound is essentially free of hydrazide groups.

2. The compound of claim 1 wherein said (AO) group is selected from the group consisting of: oxyethyleneoxy, oxy-1,2-propyleneoxy, and mixtures thereof.

3. The compound of claim 2 wherein x is from about 1 to about 25, y is from 1 to about 25, n is from about 6 to about 100, q is less than about 10, (L) contains from about to about 4 carbon atoms, r is from about 2 to about 20, the net cationic charge is at least about 1 per 10,000 molecular weight units and the molecular weight is less than about 20,000.

4. The compound of claim 3 wherein the molecular weight is less than about 10,000.

5. The compound of claim 4 wherein the cationic charge is at least about 1 per 5,000 molecular weight units.

6. The compound of claim 2 wherein the cationic charge is from about 1 per 150 molecular weight units to about per 3,000 molecular weight units.

7. The compound of claim 6 wherein the molecular weight is from about 800 lo about 10,000.

8. The compound of claim 2 wherein each x and y is from about 1.25 to about 15, n is from about 10 to about 80, q is from about 1 to about 5, (L) contains from 1 to about 2 carbon atoms, and the molecular weight is less than about 20,000.

9. The compound of claim 8 wherein the molecular weight is less than about 10,000.

10. The compound of claim 9 wherein the cationic charge is at least about 1 per 5,000 molecular weight units.

11. The compound of claim 8 wherein the cationic charge is from about 1 per 150 molecular weight units to about per 3,000 molecular weight units.

12. The compound of claim 5 wherein the molecular weight is from about 800 to about 10,000.

13. The compound of claim 3 wherein (CAT) is (R)$_m$N(—)$_{3-m}$.

14. The compound of claim 13 wherein x is from about 1.25 to about 15, y is from about 1.25 to about 15, n is from 10 to about 80, q is less than about 5, and r is from about 2 to about 10.

15. The compound of claim 14 wherein (AO) is oxyethyleneoxy and the net cationic charge is at least about 1 per 5,000 molecular weight units.

16. The compound of claim 14 wherein (AO) is a mixture of oxyethyleneoxy and oxypropyleneoxy.

17. The compound of claim 16 wherein the net cationic charge is from about 1 per 150 molecular weight units to about 1 per 3,000 molecular weight units.

18. The compound of claim 17 wherein the molecular weight is from about 800 to about 10,000.

19. The compound of claim 3 wherein (CAT) is (R)$_m$N$^\oplus$(—)$_{4-m}$A$^\ominus$.

20. The compound of claim 19 wherein x is from about 1.25 to about 15, y is from about 1.25 to about 15, n is from 10 to about 80, q is less than about 5, and r is from about 2 to about 10.

21. The compound of claim 20 wherein (AO) is oxyethyleneoxy and the net cationic charge is at least about 1 per 5,000 molecular weight units.

22. The compound of claim 20 wherein (AO) is a mixture of oxyethyleneoxy and oxypropyleneoxy.

23. The compound of claim 22 wherein the net cationic charge is from about 1 per 150 molecular weight units to about 1 per 3,000 molecular weight units.

24. The compound of claim 23 wherein the molecular weight is from about 800 to about 10,000.

25. The compound of claim 20 where (AO) is oxypropyleneoxy.

* * * * *

UNITED STATES PATENT AND TRADEMARK OFFICE
CERTIFICATE OF CORRECTION

PATENT NO. : 4,956,447

DATED : September 11, 1990         Page 1 of 2

INVENTOR(S) : Eugene P. Gosselink; Frederick E. Hardy; and Toan Trinh

It is certified that error appears in the above-identified patent and that said Letters Patent is hereby corrected as shown below:

Col. 7, line 19, "Adogen 41" should read -- Adogen 441 --.

Col. 12, line 17, "-OH-," should read -- -OH, --.

Col. 15, line 39, "used" should read -- used; --.

Col. 16, line 30, "deaction" should read -- reaction --.

Col. 17, line 32, "relatively" should read -- a relatively --.

Col. 19, line 68, "85°-190° C." should read -- 185°-190°C --.

Col. 22, line 44, "(MW=7501)" should read -- (MW=750) --.

Col. 22, line 53, "(MW$_{TM}$750)" should read -- (MW=750) --.

Col. 23, line 36, "-O{CCH$_2$CH$_2$O}$_{16}$" should read -- -O{CH$_2$CH$_2$O}$_{16}$ --.

Col. 24, line 52, "2 47" should read -- 2.47 --.

Col. 25, line 8, "230 C" should read -- 230°C --.

Col. 26, line 27, "H" should read -- H, --.

Col. 26, line 35, "C(O)-," should be deleted.

Col. 29, line 11, "TM" should read -- = --.

Col. 29, line 32, "53.3  66.0" should read -- 53.3 and 66.0 --.

Col. 30, line 26, "(CPSRA 91)" should read -- (CPSRA 9) --.

UNITED STATES PATENT AND TRADEMARK OFFICE
CERTIFICATE OF CORRECTION

PATENT NO. : 4,956,447

DATED : September 11, 1990

INVENTOR(S) : Eugene P. Gosselink; Frederick E. Hardy; and Toan Trinh

It is certified that error appears in the above-identified patent and that said Letters Patent is hereby corrected as shown below:

Col. 31, line 6, "= 13)." should read -- = 13), --.

Col. 31, line 32, "= 421)" should read -- = 42), --.

Col. 34, line 36, "1931" should read -- 1934 --.

Col. 36, line 69, insert -- $(R)_m N^{\oplus}$ $(-)_{4-m}$ $A^{\ominus}$ wherein each "m" is from 0 to 3; and --.

Col. 22, line 44, "(Oxy-2-)" should read --(OXY-1,2-)--.

Signed and Sealed this

First Day of June, 1993

Attest:

MICHAEL K. KIRK

*Attesting Officer*     *Acting Commissioner of Patents and Trademarks*